United States Patent [19]
Ichikawa et al.

[11] Patent Number: 5,659,491
[45] Date of Patent: Aug. 19, 1997

[54] METHOD AND SYSTEM FOR INSPECTING AN ASSEMBLY, AND ELECTRICAL INSPECTION APPARATUS FOR A FLASH UNIT

[75] Inventors: Fusao Ichikawa; Ryo Mori; Hiroyuki Ota, all of Kanagawa, Japan

[73] Assignee: Fuji Photo Film Co., Ltd., Kanagawa, Japan

[21] Appl. No.: 355,975

[22] Filed: Dec. 14, 1994

[30] Foreign Application Priority Data

| Dec. 14, 1993 | [JP] | Japan | 5-313824 |
|---|---|---|---|
| Dec. 20, 1993 | [JP] | Japan | 5-319911 |
| Oct. 20, 1994 | [JP] | Japan | 6-255330 |
| Oct. 25, 1994 | [JP] | Japan | 6-260160 |

[51] Int. Cl.⁶ .................................. G05B 19/418
[52] U.S. Cl. ...................... 364/551.01; 364/468.19; 364/468.2; 364/468.22
[58] Field of Search ................ 364/551.01, 478, 364/507, 552, 222.6, 917.1, 917.2, 917.6, 917.7, 917.9, 468, 468.19, 468.2, 468.21, 468.22, 468.23, 478.05, 478.07, 478.1, 478.13; 348/91, 92; 198/339.1, 340, 341; 209/936; 73/865.8

[56] References Cited

U.S. PATENT DOCUMENTS

| 4,275,451 | 6/1981 | Balzarini et al. | 364/580 |
|---|---|---|---|
| 4,591,991 | 5/1986 | Sticht | 364/478 |
| 4,646,245 | 2/1987 | Prodel et al. | 364/468 |
| 4,831,540 | 5/1989 | Hesser | 364/468 |
| 5,086,397 | 2/1992 | Schuster et al. | 364/468 |
| 5,315,484 | 5/1994 | Asano | 361/765 |
| 5,353,230 | 10/1994 | Maejima et al. | 364/468 |
| 5,434,790 | 7/1995 | Saka et al. | 364/468 |
| 5,555,504 | 9/1996 | Lepper et al. | 364/468.22 |

FOREIGN PATENT DOCUMENTS

| 0103730 | 3/1984 | European Pat. Off. | B07C 3/12 |
|---|---|---|---|
| 2616232 | 6/1988 | France | G03B 15/00 |
| 3626775 | 9/1987 | Germany | B65B 57/00 |
| WO8606303 | 11/1986 | WIPO | B07C 3/12 |

OTHER PUBLICATIONS

Patent Abstracts of Japan vol. 017 No. 441, Apr. 16, 1993, JP-A-05 093950 (Fuji Photo Film Co., Ltd).
Patent Abstracts of Japan vol. 018 No. 513, Jun. 24, 1994, JP-A-06 175295 (Fuji Photo Film Co., Ltd).
Patent Abstracts of Japan vol. 017 No. 504, May 25, 1993, JP-A-05 129769 (Fuji Photo Film Co., Ltd).

*Primary Examiner*—Emanuel T. Voeltz
*Assistant Examiner*—Tony M. Cole
*Attorney, Agent, or Firm*—Sughrue, Mion, Zinn, Macpeak & Seas

[57] ABSTRACT

An inspection system for assemblies, especially for flash units of used film packages as to if the flash units are reusable. The inspection system circulates pallets each holding a flash unit in a predetermined posture around a plurality of inspection stations for various inspection items. Inspection data detected in each inspection station is written in a memory of the pallet through a data communication system disposed in each pallet and each inspection station. A computer reads the memory for classifying the flash unit on the basis of the inspection data on all inspection items and writes classification data in the memory. A plurality of electrical inspection apparatuses are disposed in the inspection system for simultaneously inspecting electrical properties of a plurality of flash units. Each inspection apparatus has proving pins, an actuator and a photo-sensor which are moved into their operative positions when the pallet holding the flash unit is stopped at the inspection apparatus, wherein the inspection apparatus charges a main capacitor with a high D.C. voltage while measuring the voltage of the main capacitor.

15 Claims, 26 Drawing Sheets

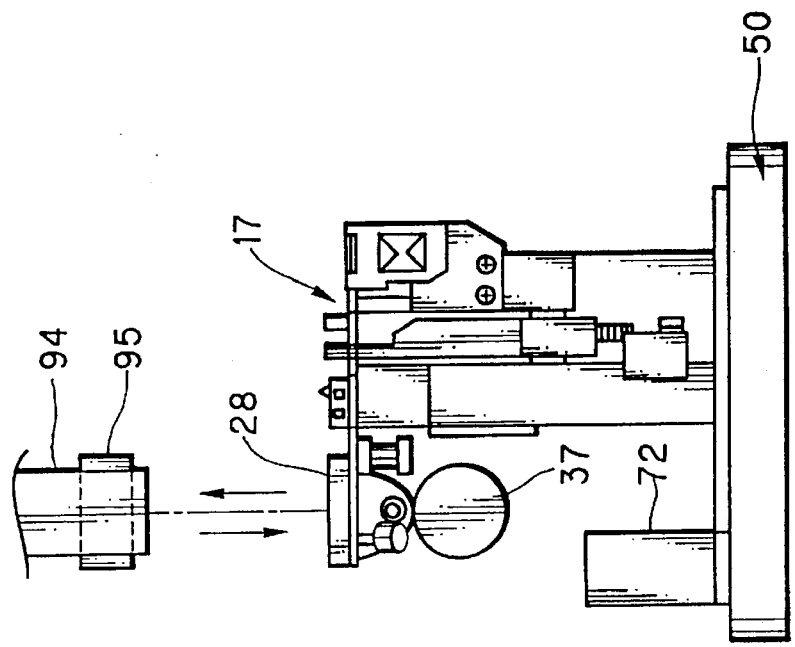
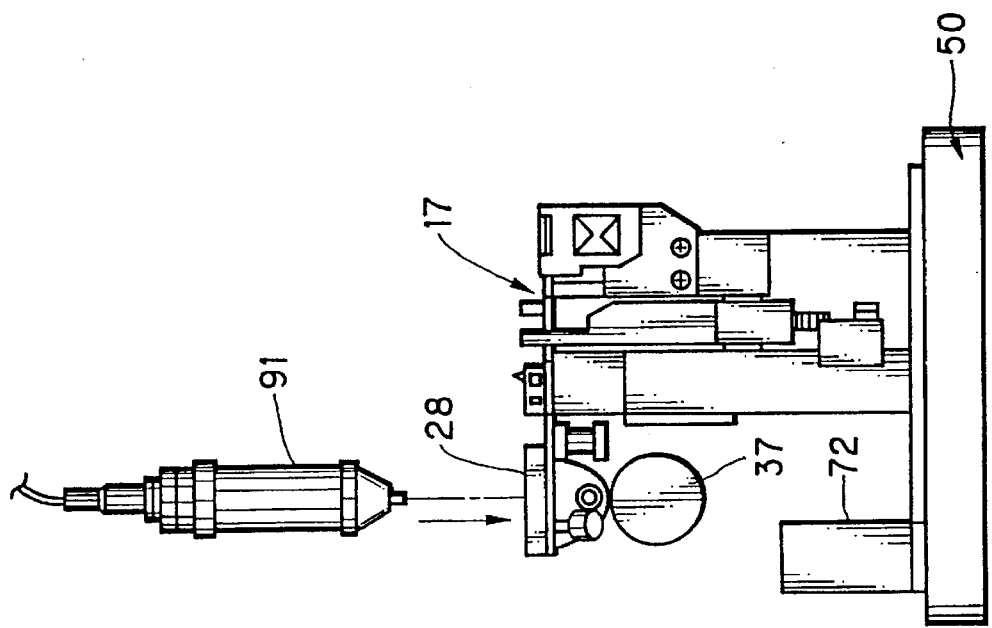
FIG.10A
FIG.10B

FIG.19

```
*** ITEMIZED CUMULATION OF REJECTION ***
```

| STEP | CHANNEL 1 | 2 | 3 | 4 | 5 | 6 | 7 | 8 | | |
|---|---|---|---|---|---|---|---|---|---|---|
| | OK | OK | NG | OK | NG | OK | OK | OK | | |
| OK | #### | #### | #### | #### | #### | #### | #### | #### | | |
| NG | #### | #### | #### | #### | #### | #### | #### | #### | | |
| 2 | #### | #### | #### | #### | #### | #### | #### | #### | (CONTACT RESISTANCE) |
| 3 | #### | #### | #### | #### | #### | #### | #### | #### | (LEAK CURRENT) |
| 4 | #### | #### | #### | #### | #### | #### | #### | #### | (INITIAL CHARGE VOLTAGE) |
| 5 | #### | #### | #### | #### | #### | #### | #### | #### | (CHARGE TIME 1) |
| 8 | #### | #### | #### | #### | #### | #### | #### | #### | (RAPID CHARGE TIME) |
| 10 | #### | #### | #### | #### | #### | #### | #### | #### | (FLASH LIGHT AMOUNT) |
| 11 | #### | #### | #### | #### | #### | #### | #### | #### | (CHARGE TIME 2) |
| 12 | #### | #### | #### | #### | #### | #### | #### | #### | (NEON TURN-ON VOLTAGE) |
| 13 | #### | #### | #### | #### | #### | #### | #### | #### | (FULL CHARGE TIME) |
| 14 | #### | #### | #### | #### | #### | #### | #### | #### | (ON-OFF CYCLES OF NEON INCICATOR) |

SET-UP   TOTAL   ON-LINE   MANUAL   FILE   MENU   NEXT PAGE

FIG. 20

| *** | PERCENTAGE DATA *** | | | | | | | | | | | | | | | | |
|---|---|---|---|---|---|---|---|---|---|---|---|---|---|---|---|---|---|
| STEP | CHANNEL | | | | | | | | | | | | | | | | |
| | 1 | | 2 | | 3 | | 4 | | 5 | | 6 | | 7 | | 8 | |
| | OK | | OK | | NG | | OK | | NG | | OK | | OK | | NG | |
| INPUT | #### | | #### | | #### | | #### | | #### | | #### | | #### | | #### | |
| OK | #### | | #### | | #### | | #### | | #### | | #### | | #### | | #### | |
| NG | #### | | #### | | #### | | #### | | #### | | #### | | #### | | #### | |
| PERCENTAGE OF RETENTION | | | | | | | | | | | | | | | | | |
| 1 | #### | | #### | | #### | | #### | | #### | | #### | | #### | | #### | |
| 2 | #### | | #### | | #### | | #### | | #### | | #### | | #### | | #### | |
| 3 | #### | | #### | | #### | | #### | | #### | | #### | | #### | | #### | |
| 4 | #### | | #### | | #### | | #### | | #### | | #### | | #### | | #### | |
| 5 | #### | | #### | | #### | | #### | | #### | | #### | | #### | | #### | |
| 6 | #### | | #### | | #### | | #### | | #### | | #### | | #### | | #### | |
| 7 | #### | | #### | | #### | | #### | | #### | | #### | | #### | | #### | |
| 8 | #### | | #### | | #### | | #### | | #### | | #### | | #### | | #### | |
| 9 | #### | | #### | | #### | | #### | | #### | | #### | | #### | | #### | |
| 10 | #### | | #### | | #### | | #### | | #### | | #### | | #### | | #### | |
| 11 | #### | | #### | | #### | | #### | | #### | | #### | | #### | | #### | |
| 12 | #### | | #### | | #### | | #### | | #### | | #### | | #### | | #### | |
| 13 | #### | | #### | | #### | | #### | | #### | | #### | | #### | | #### | |
| 14 | #### | | #### | | #### | | #### | | #### | | #### | | #### | | #### | |
| 15 | #### | | #### | | #### | | #### | | #### | | #### | | #### | | #### | |
| 16 | #### | | #### | | #### | | #### | | #### | | #### | | #### | | #### | |

TOTAL   ON-LINE   MANUAL   FILE   MENU   SET-UP   MANUAL MODE

FIG. 21

DATE/TIME　　　　　　　　\*\*\* OK/NG DATA \*\*\*
NAME OF MANUFACTURER # ## ## ## ##
LOT NAME　　　　　　　　# # #

| STEP | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | OK | OK | OK | OK | OK | OK | OK | OK | OK | OK | OK | OK | OK | OK | OK | OK |
| 2 | OK | OK | OK | OK | OK | OK | OK | OK | OK | OK | OK | OK | OK | OK | OK | OK |
| 3 | OK | OK | OK | OK | OK | OK | OK | OK | OK | OK | OK | OK | OK | OK | OK | OK |
| 4 | OK | OK | OK | OK | OK | OK | OK | OK | OK | OK | OK | OK | OK | OK | OK | OK |
| 5 | OK | OK | OK | OK | OK | OK | OK | OK | OK | OK | OK | OK | OK | OK | OK | OK |
| 6 | OK | OK | OK | OK | OK | OK | OK | OK | OK | OK | OK | OK | OK | OK | OK | OK |
| 7 | OK | OK | OK | OK | OK | OK | OK | OK | OK | OK | OK | OK | OK | OK | OK | OK |
| 8 | OK | OK | OK | OK | OK | OK | OK | OK | OK | OK | OK | OK | OK | OK | OK | OK |
| 9 | OK | OK | OK | OK | OK | OK | OK | OK | OK | OK | OK | OK | OK | OK | OK | OK |
| 10 | OK | OK | OK | OK | OK | OK | OK | OK | OK | OK | OK | OK | OK | OK | OK | OK |
| 11 | OK | OK | OK | OK | OK | OK | OK | OK | OK | OK | OK | OK | OK | OK | OK | OK |
| 12 | OK | OK | OK | OK | OK | OK | OK | OK | OK | OK | OK | OK | OK | OK | OK | OK |
| 13 | OK | OK | OK | OK | OK | OK | OK | OK | OK | OK | OK | OK | OK | OK | OK | OK |
| . . . . | | | | | | | | | | | | | | | | |

SET-UP　TOTAL　ON-LINE　MANUAL　FILE　MENU

FIG. 24

| GROUP | A | B | C | D | E | F | G | H | I | J | K | L |
|---|---|---|---|---|---|---|---|---|---|---|---|---|
| UNMEASURED | 37 | 67 | 14 | 11 | 12 | 4 | 4 | 11 | 19 | 33 | 88 | 25 |
| 1 | α | | | | | | | | | | | |
| 2 | 4 | 900 | 824 | 965 | 923 | | | | | | 130 | |
| 3 | 4 | 705 | 680 | 610 | 703 | | | | | | 432 | |
| 4 | 3 | 682 | 421 | 205 | 227 | | 3 | 1 | | | 724 | 39 |
| 5 | 4 | 403 | 98 | 62 | 72 | 1 | 15 | | 4 | 185 | | 2 |
| 6 | 4 | 280 | 3 | 2 | 3 | | 21 | | | 303 | | |
| 7 | 7 | 154 | 3 | 1 | 2 | 2 | 105 | 1 | 3 | 543 | | |
| 8 | 5 | 45 | 3 | | 1 | 41 | 296 | 1 | 26 | | 964 | 21 |
| 9 | 12 | 31 | 1 | | | 36 | 632 | 2 | 136 | | 828 | 129 |
| 10 | 33 | 38 | 1 | | 1 | | | 10 | 525 | 782 | 596 | 180 |
| 11 | 35 | 27 | 2 | | | 707 | | 89 | 770 | 282 | 253 | 273 |
| 12 | 64 | 23 | | | | 819 | | 425 | | 167 | 182 | 341 |
| 13 | 80 | 15 | | | | 825 | 849 | 707 | 439 | 65 | 65 | |
| 14 | 142 | 16 | | | | 812 | 105 | | 96 | 19 | 24 | 46 |
| 15 | 303 | 15 | 1 | | | 267 | 40 | | 24 | 5 | 9 | 3 |
| 16 | 654 | 13 | | 1 | | 133 | 22 | 621 | 6 | 2 | 4 | |
| 17 | β 11 | 14 | | | | 67 | 8 | 183 | | | 1 | 1 |
| 18 | 3 | 11 | | | | 2 | 3 | 74 | 1 | | 2 | |
| 19 | 8 | 3 | | 1 | | 2 | 7 | 23 | | | | 1 |
| 20 | 5 | 8 | | | | | 2 | 6 | | | 1 | |
| 21 | 6 | 5 | | | | 2 | 2 | | | | | 1 |
| 22 | γ 6 | 6 | | | | 4 | 15 | 17 | 50 | 33 | 88 | 25 |
| NG | 37 | 229 | 28 | 16 | 19 | | | | | | | |
| % | 2.59 | 6.61 | 1.37 | 0.86 | 0.98 | 0.11 | 0.71 | 0.79 | 2.43 | 1.31 | 2.04 | 2.36 |

METHOD AND SYSTEM FOR INSPECTING AN ASSEMBLY, AND ELECTRICAL INSPECTION APPARATUS FOR A FLASH UNIT

BACKGROUND OF THE INVENTION

1. Field of the Invention

The present invention relates to a method and system for inspecting an assembly consisting of a plurality of parts, especially for inspecting a flash unit. More particularly, the present invention relates to a method and apparatus for inspecting electrical properties of a flash unit of a recovered lens-fitted photographic film package as to if the flash unit is reusable.

2. Related Art

Lens-fitted photographic film packages (hereinafter referred to simply as film packages) are now on the market. As disclosed in U.S. Pat. No. 4,884,087, the film packages are preloaded with a 135-type photographic film cassette (hereinafter referred to as film cassette) defined by the International Standard Organization (ISO) version 1007, 1979. A package housing of the film package is constitute of a main section loaded with the film cassette, a front cover secured in front of the main section, and a rear cover secured behind the main section. The main section includes a shutter mechanism and a taking lens. The film package is intended to be forwarded to a photo-lab in its entirety after photography. In the photo-lab, a photofinisher removes the cassette with the exposed photo film, treats the photo film in development and printing while using a conventional photofinishing system, to produce photo-prints. The photo-prints and the developed photo film are returned to the user.

Also a film package with a built-in flash device is disclosed, e.g. in U.S. Pat. No. 5,315,484.

Meanwhile, in the interest of environmental protection or the reduction of industrial waste, public concern is now directed to recycling parts of industrial products. Also the used film packages are recovered from the photofinishers, and disassembled and inspected by the manufacturer or the like, and reused in new film packages or melted for use as raw materials. To this end, film packages suitable for reuse have recently been proposed. For example, in the film package disclosed in U.S. Pat. No. 5,315,484, exposure mechanisms including a shutter, film advancing and frame counting mechanisms are assembled into a shutter unit which may also be referred to as a photo-taking unit. Also a flash device is formed as an independent assembly having a flash tube, a main capacitor and other electric components or parts mounted on a printed circuit board, so as to be reusable in a new film package.

In order to reuse an assembly, the assembly must be inspected as to if the assembly operates normally. Also the flash unit and the photo-taking unit of the film package must be inspected regarding their performance before reuse. However, most of the process of the conventional inspection has not yet been automated, and the photo-taking unit and the flash unit have so many members to be inspected, that the conventional manual inspection has been very complicated and time-consuming. Particularly, the flash unit must be inspected regarding more than twenty items, including appearance of the flash emitting portion and electrical performance of the flash tube.

In addition, for measuring electrical properties of the flash unit, it is necessary to repeat charging and discharging the main capacitor many times, and that, charging of the main capacitor takes relatively large time in the conventional inspection process. This also increases the total time necessary for inspecting a flash unit. Consequently, recycling the flash unit has been uneconomical.

Furthermore, while the data obtained by the inspection is conventionally utilized merely for judging whether the inspected assembly is reusable or not, it is desirable to make use of the inspection data for other purpose, e.g., for grasping the failure occurrence in the assemblies after marketing.

SUMMARY OF THE INVENTION

In view of the foregoing, a primary object of the present invention is to provide a method for inspecting an assembly, especially a flash unit of a film package, at a high efficiency, and a system for that method.

Another object of the present invention is an inspection method and system wherein various inspection data may be efficiently utilized for many purposes as well as for discrimination between reusable and not-reusable assemblies.

A further object of the present invention is to provide a method and apparatus for inspecting electrical performance of the flash unit at a high speed.

To achieve the above objects, the present invention holds an assembly constituted of a plurality of parts by a pallet in a predetermined state, circulates the pallet around a plurality of inspection stations for sequentially inspecting the assembly with respect to a plurality of inspection items. The pallet is provided with a data management device having a data memory and a data communication system for allowing to read and write the data memory through remote processing, so that measurement data obtained in each inspection station is stored in the data memory. The measurement data of each inspection item is judged with reference to threshold values which are predetermined for each inspection item, and the assembly is classified according to the judgments on all of the inspection items. Judgment data and classification data obtained in the above judging step and classification step is also stored in the data memory, and the assembly is discharged from the pallet into one of a plurality of assembly storage sections according to the classification data.

An inspection system according to the present invention is comprised by pallets each holding the assembly in a predetermined state, a circulating device for circulating the pallets around a plurality of inspection stations for sequentially inspecting the assembly with respect to a plurality of inspection items, a data management device provided in each pallet and having a data memory and a data communication system, a judging device which makes a judgment on each inspection item by comparing the measurement data with threshold values which are predetermined for each inspection item, and writes judgment data in the data memory of the data management device, a control device which collects the measurement data and the judgment data, classifies the assembly depending on the judgment data of all the inspection items, and writes classification data in the data memory of the data management device, and a discharging device which reads the classification data from said data memory and discharges the assembly from the pallet into one of a plurality of assembly storage sections according to the classification data.

In this way, inspection and classification steps are entirely automated. Since the inspection data including the measurement data and the judgment data is managed for each inspection item in the present invention, it is possible to precisely determine reparable parts in the assembly.

Therefore, not only reusable assemblies but also reparable assemblies can be recovered at a high accuracy, so that the recycling efficiency is improved. Since the inspection data is totally managed by the single control device, the data can be efficiently utilized for many purpose through on-line and/or off-line system.

An electrical inspection apparatus for a flash unit according to the invention has a base portion movable between a retracted position retracted from a path of the flash unit, which is conveyed on a pallet conveyer in a predetermined posture, and an operative position near the flash unit fed to and stopped at the inspection apparatus. Proving pins, an actuator and a photo-sensor are mounted in the movable base portion to be moved together with the base portion. When the base portion is in the operative position, the proving pins are brought into contact with a charge switch, a main capacitor, a synchronizing switch and power supply terminals of the flash unit, and the actuator can actuate the synchronizing switch, whereas the photo-sensor can detect light from a flash tube of the flash unit. The electrical inspection apparatus also has a power supply device connectable to the power supply terminals through the proving pins, and a controller which controls charging of the main capacitor through the proving pins and drives the actuator to turn the synchronizing switch on to measure light amount from the flash tube through the photo-sensor.

According to a preferred embodiment, the power supply device includes a high D.C. voltage supply device which charges the main capacitor with a high D.C. voltage less than a withstand voltage of the main capacitor, while measuring the voltage of the main capacitor, and terminates charging when the voltage of the main capacitor reaches a given level.

The electrical inspection apparatus of the present invention can inspect electrical properties of the flash unit efficiently at a high speed.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein:

FIGS. 10A and 10B are explanatory views illustrating a face cleaning device of the inspection system;

FIGS. 19 to 22 are examples of inspection data tables and graphs provided by the inspection system;

FIG. 24 is a frequency distribution table indicating the occurrence of each group value for each inspection item;

DETAILED DESCRIPTION OF THE PREFERRED EMBODIMENT

Figure 1:
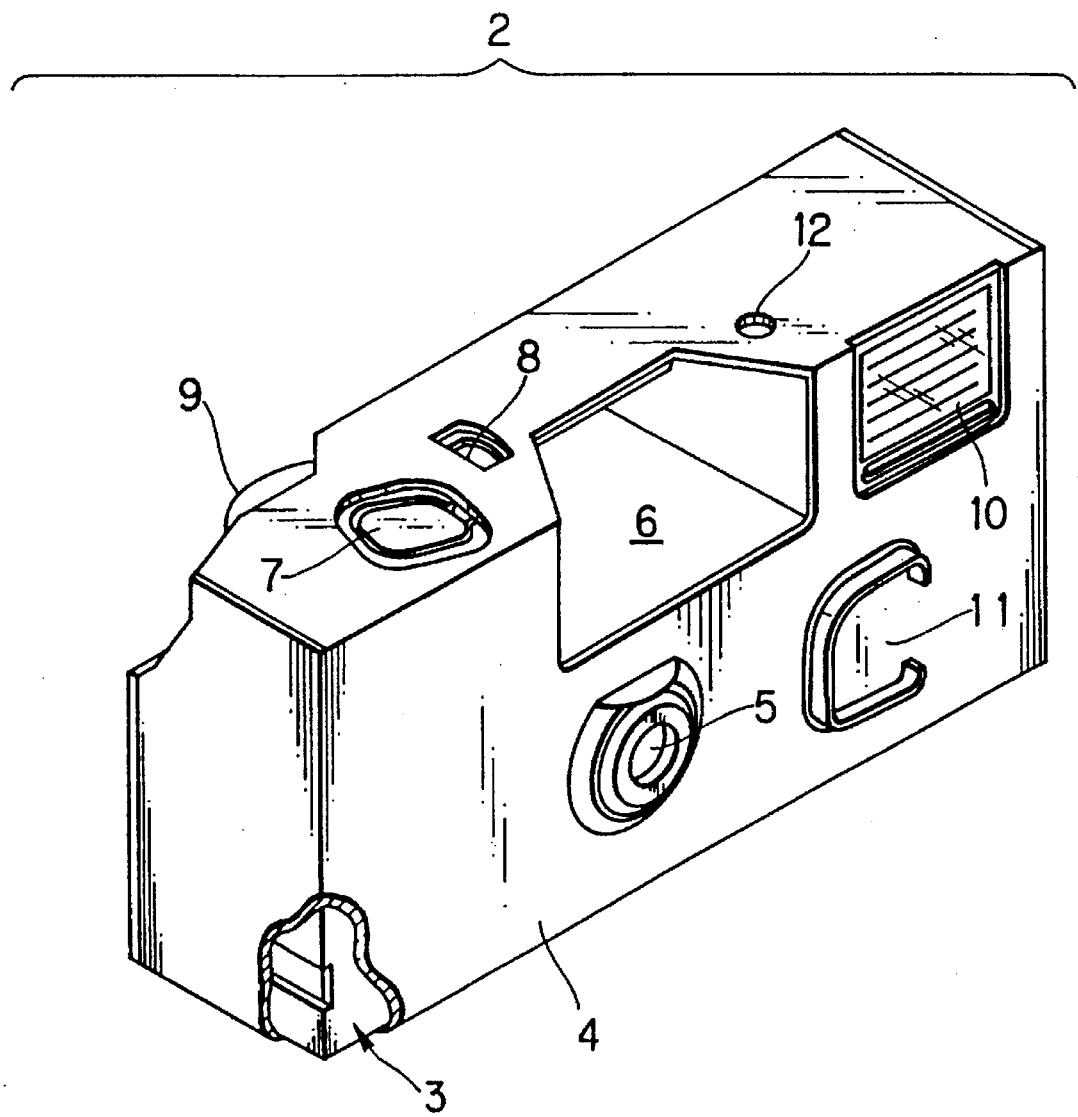
FIG. 1 is a perspective view of a film package with a flash unit.

As shown in FIG. 1, a film package 2 is constituted of a unit body 3 and an outer casing 4 for wrapping the unit body 3 such that the film package 2 can take pictures without the need for removal of the outer casing 4. The outer casing 4 is made of a cardboard box or a plastic sheet having a decorative print thereon for making the appearance of the film package 2 attractive. A taking lens 5, a viewfinder window 6, a release button 7, a frame number dial 8, a film advancing wheel 9 and a flash emitting portion 10 are exposed to the outside through openings and cut-outs formed through the outer casing 4. A movable segment 11 cut in the outer casing 4 is to be depressed when executing a flash photography.

Figure 2:
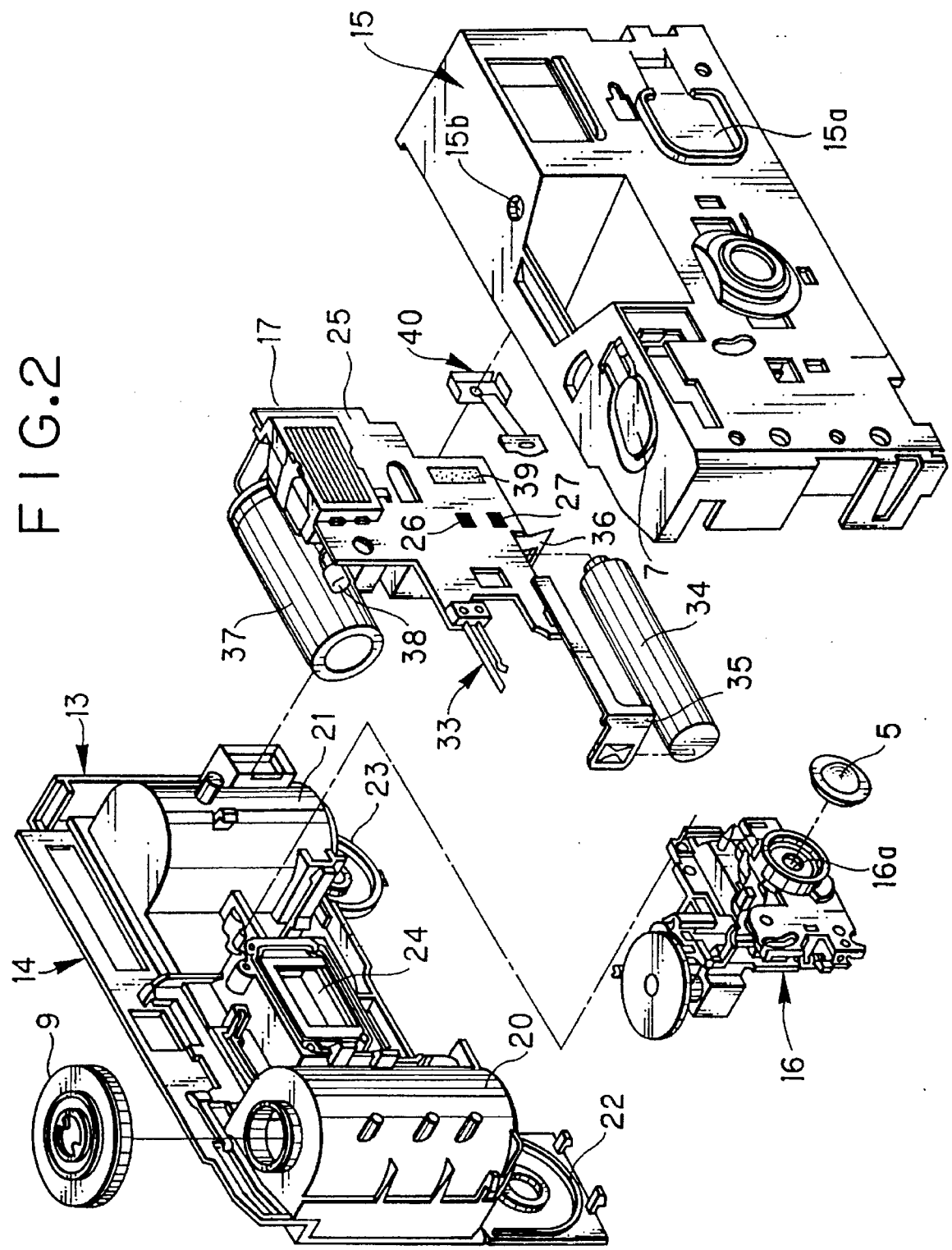
FIG. 2 is an exploded perspective view of the film package shown in FIG. 1.

Referring to FIG. 2, the unit body 3 is constituted of a main housing 13 loaded with a film cassette, a rear cover 14 secured to the rear of the main housing 13 to light-tightly contain the film cassette between the main housing 13 and the rear cover 14, a front cover 15 attached to the front of the main housing 15, a photo-taking unit 16 and a flash unit 17 which are disposed between the main housing 13 and the front cover 15. The photo-taking unit 16 has the taking lens 5 and mechanisms for frame counting, shutter cocking-releasing and one-frame film advancing which are incorporated into one unit. The taking lens 5 is held between a stop aperture 16a of the photo-taking unit 16 and the front cover 15.

The main housing 13 is provided with a cassette chamber 20 for holding a cassette shell of the film cassette, and a film supply chamber 21 for holding a roll of unexposed photographic film which is withdrawn from the cassette shell and wound in the roll. These chambers 20 and 21 have open bottoms, which are closed by bottom lids 22 and 23 formed integrally with the rear cover 14, respectively. The bottom lid 23 of the film supply chamber 21 is provided for permitting insertion of a tool into the chamber 21 for winding up the unexposed photographic film from the cassette shell. The bottom lid 22 of the cassette chamber 20 is provided for permitting removal of the photographic film after exposure.

An exposure aperture 24 is formed between the cassette chamber 20 and the film supply chamber 21, and the photo-taking unit 16 is detachably attached to the front of the exposure aperture 24 through snap-in engagement or the like. The flash unit 17 is attached to the front of the film supply chamber 21 on the right side of the photo-taking unit 16, also in a detachable fashion through snap-in engagement.

Figure 3:
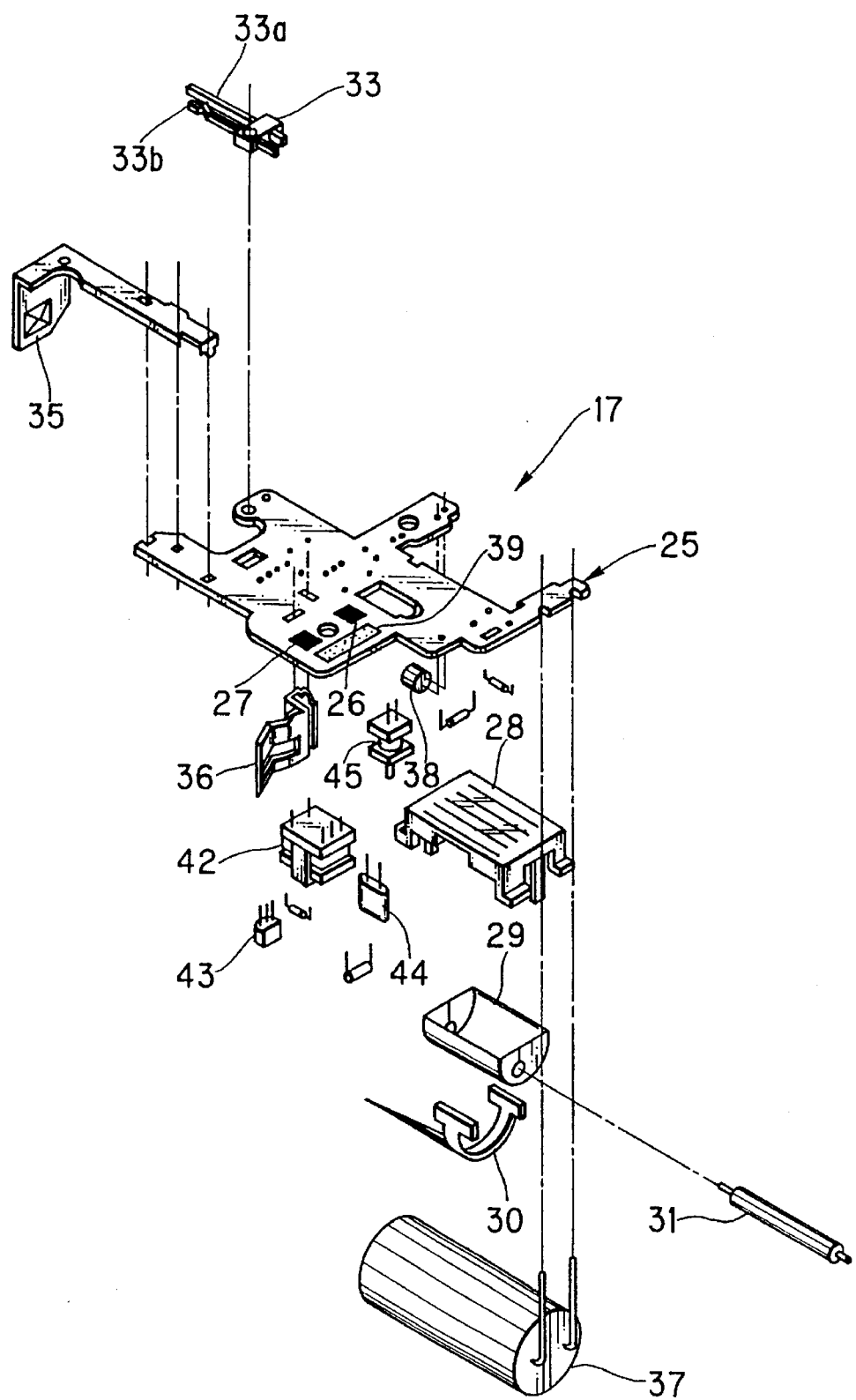
FIG. 3 is an exploded perspective view of the flash assembly shown in FIG. 2.

As shown in FIG. 3, the flash unit 17 is constituted of a printed circuit board 25 and electric parts soldered to holes formed through the printed circuit board 25. The printed circuit board 25 has a printed circuit pattern of copper foil including a pair of charge starting contacts 26 and 27. Besides the flash emitting portion 10 constituted of a protector 28, a reflector 29, a trigger electrode 30 and a discharge tube or flash tube 31, a synchronizing switch 33, a pair of electrode plates 35 and 36 for supporting a battery 34, a main capacitor 37, a neon indicator 38 and other electric parts are mounted to the printed circuit board 25. A recording portion 39 is provided on one side of the circuit pattern, which has records about the flash unit 17, including the date of production and the number and time of past reuse thereon.

One end of the discharge tube 31 is connected to the main capacitor 37, and the other end is grounded, so that the charge loaded in the main capacitor 37 is discharged through the discharge tube 31, to cause the discharge tube 31 to flash. The protector 28 is a transparent diffusion plate exposed to the outside through an opening of the outer casing 4 for projecting light from the discharge tube 31 toward a photographic subject. The reflector 29 reflects the light from the discharge tube 3 toward the protector 28.

Referring again to FIG. 2, a charge switch segment 15a is formed integrally with the front cover 15 in a position behind the cut segment 11 of the outer casing 4. A switch plate 40 is disposed on the rear side of the charge switch segment 15a to bridge between the charge starting contacts 26 and 27 when the charge switch segment 15a is depressed together with the cut segment 11 for start charging the main capacitor 37. When the charging is complete, the neon indicator 38 begins to emit light intermittently. The neon indicator 38 is visible from outside through openings 15b and 12 which are formed in top wall portions of the front cover 15 and the outer casing 4, respectively. The synchronizing switch 33 is turned on when its contact strip 33a is pushed to contact another contact strip 33b thereof by a shutter blade of the shutter mechanism of the photo-taking unit 16 in a position where the stop aperture 16a is fully opened.

Figure 4:
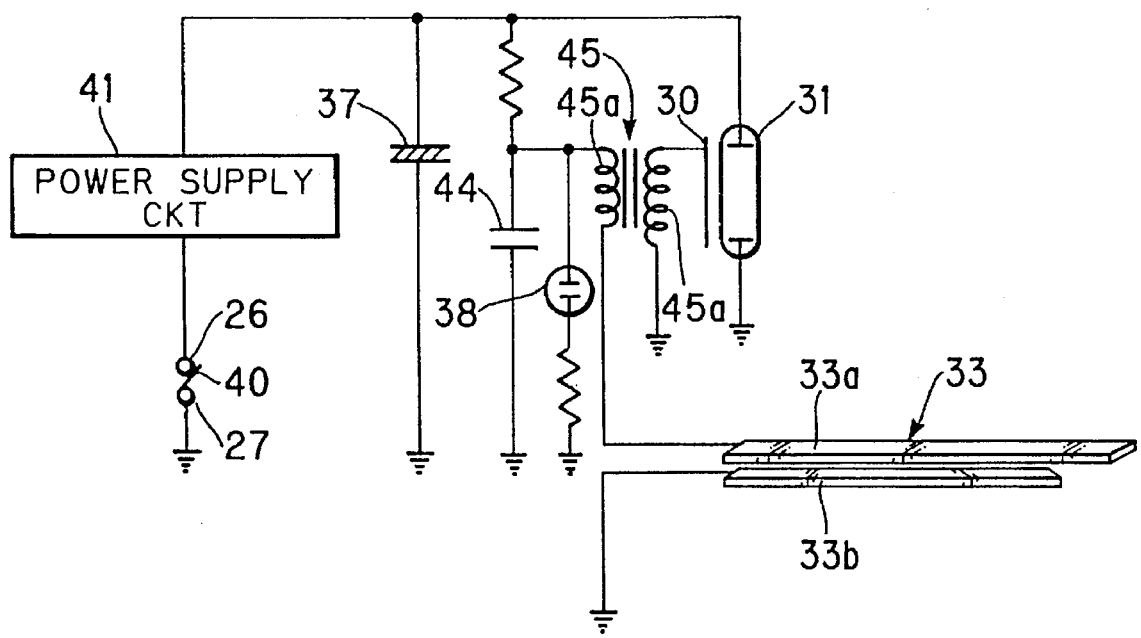
FIG. 4 is a circuit diagram of the film package.

As shown in FIG. 4 illustrating the circuitry of the flash unit 17, the charge starting contacts 26 and 27 are connected in series to a conventional power supply circuit 41 which is constituted of the battery 34, a booster 42 and a transistor 43 (FIG. 3), so that a high voltage output from the power supply circuit 41 charges a trigger capacitor 44 and the main capacitor 37 when the charge starting contact 26 and 27 are turned on. The trigger capacitor 44 is connected to a trigger transformer 45 whose primary coil 45a is connected to the contact strip 33a of the synchronizing switch 33, while the secondary coil 45b is connected to the trigger electrode 30 for causing the discharge tube 31 to start discharging.

In a factory, the film packages 2 collected from photofinishers are put on a feeding conveyer. While the film packages 2 is being conveyed on the feeding conveyer toward a film package disassembling line 46 (FIG. 5), the outer casings 4 are removed. In the film package disassembling line 46, the film packages 2 are put on a stepwise rotating table to be disassembled in a sequence. The stepwise rotating table has a plurality of disassembling pallets secured at regular intervals each for holding a film package 2 in a constant posture. The film package 2 held by the pallet is automatically disassembled at respective stations into the film advancing wheel 9, the front cover 15, the taking lens 5, the switch plate 40, the flash unit 17, the photo-taking unit 16, the battery 34 and the main housing 13 joined with the rear cover 14.

Figure 5:
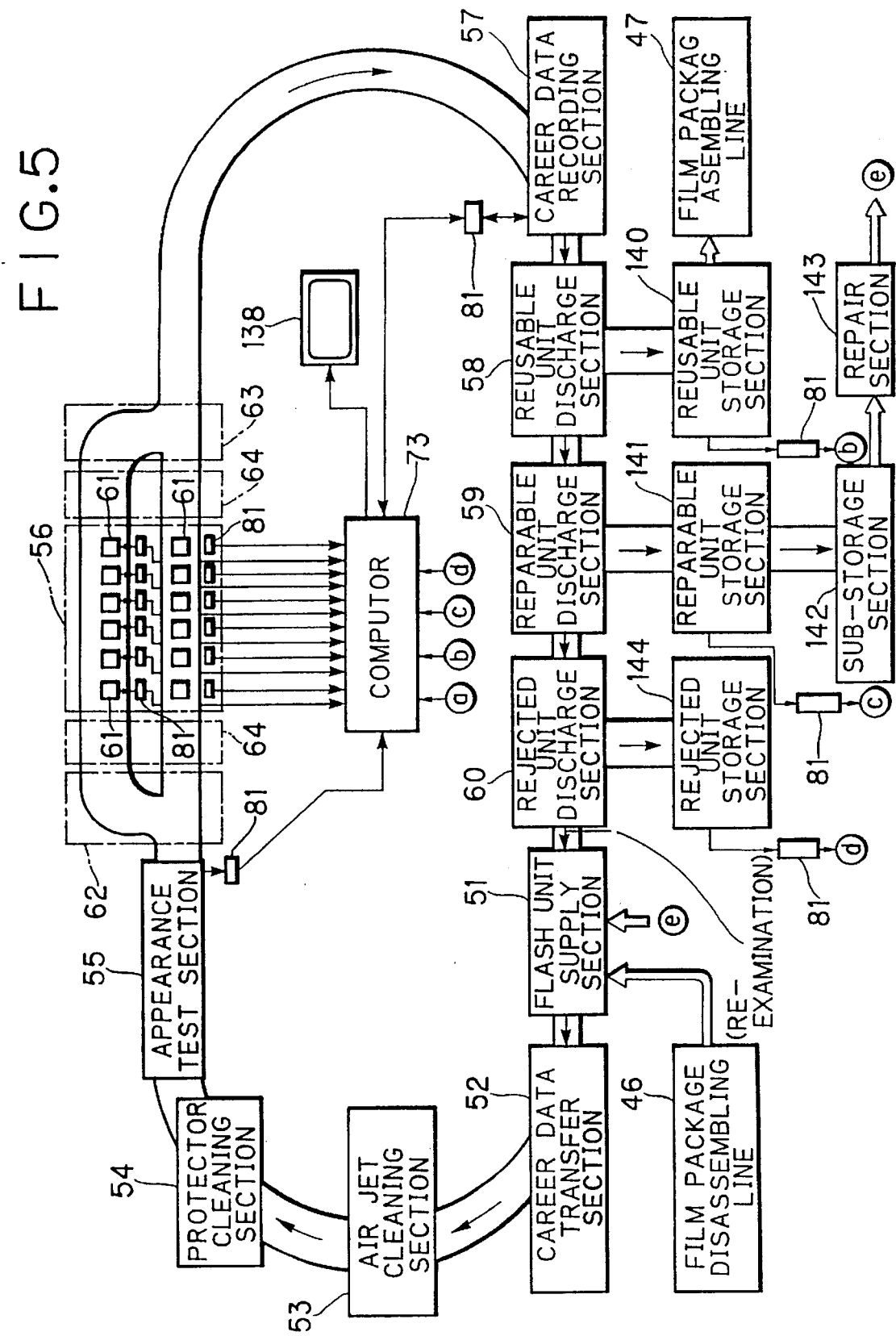
FIG. 5 is an explanatory view of an inspection system for the flash unit, according to a preferred embodiment of the invention.

Since the film advancing wheel 9, the front cover 15 and the main housing 13 with the rear cover 14 are made from the same plastic material, these parts are melted into a resin raw material in a resin recycling station. The taking lens 5, as being made of a different plastic material, is sent to another resin recycling station. The switch plate 40 is sent to a metal recycling station. The photo-taking unit 16 is inspected and, if pass the inspection, sent to a film package assembling line 47 (FIG. 5). The battery 34 is forwarded to battery collection traders.

Figure 6:
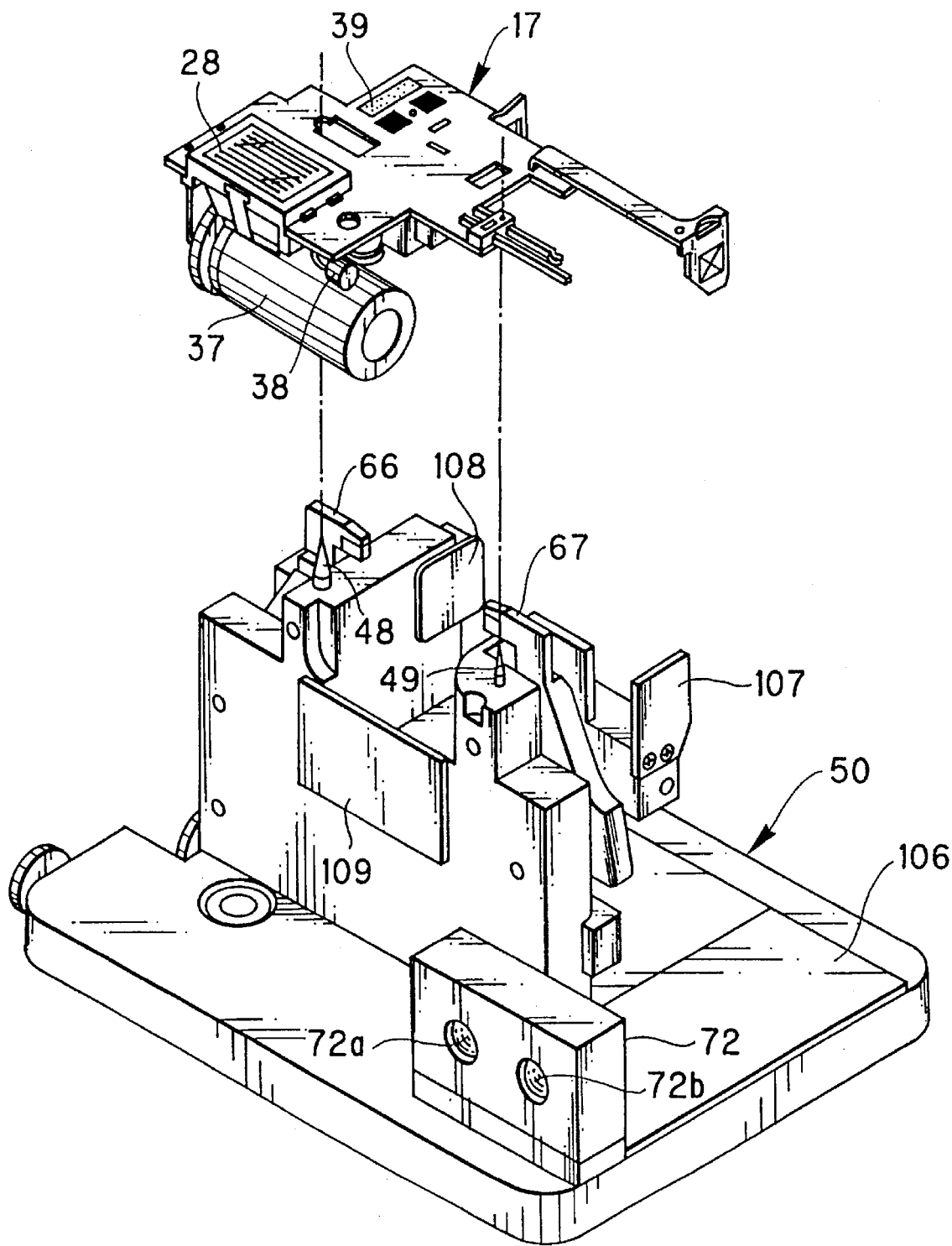
FIG. 6 is a perspective view of a pallet for conveying the flash unit through the inspection system, according to a preferred embodiment of the invention.

As to the flash unit 17, the date of production and the date and number of recycling are automatically read from the recording portion 39, so that only those flash assemblies 17 which are not over a predetermined service life are sent to an inspection line. The inspection line is an automated circulating line, as is shown in FIG. 5, wherein the flash assemblies 17 are held in a predetermined posture by inspection pallets 50 as shown in FIG. 6, and the pallets 50 are circulated around a plurality of inspection stations for inspecting the flash assemblies 17 regarding appearance, electric properties, operations and so forth. According to the results of the inspection, the flash assemblies 17 are classified into reusable, not-reusable and reparable ones as well as those to be inspected again. The usable flash units 17 are sent to the film package assembling line 47.

The inspection line includes a flash unit supply section 51, a career data transfer section 52, an air jet cleaning section 53, a flashing face cleaning section 54, an appearance test section 55, electrical inspection section 56, a data transfer and career recording section 57, a reusable unit discharge section 58, a reparable unit discharge section 59 and a not-reusable or rejected unit discharge section 60.

In the electrical inspection section 56, the inspection line is branched into a plurality of, e.g., two channels, and a plurality of, e.g., six electrical inspection apparatuses 61 are provided in each channel. Accordingly, six pallets 50 may be located in each channel so that six flash units 17 may be inspected at a time. Therefore, by actuating both channels, twelve flash units 17 may be inspected at the same time. Each channel is numbered so that one or more of those channels can be selectively actuated by designating the channel numbers through an on-line equipment. Before and behind the electrical inspection section 56, there are disposed a branching section 62 and a joining section 63 respectively. Also accumulating section 64 for transiently accumulating a predetermined number of, that is, six pallets 50 in this instance, are provided between the branching section 62 and the electrical inspection section 56, as well as between the electrical inspection section 56 and the joining section 63.

Figure 7:
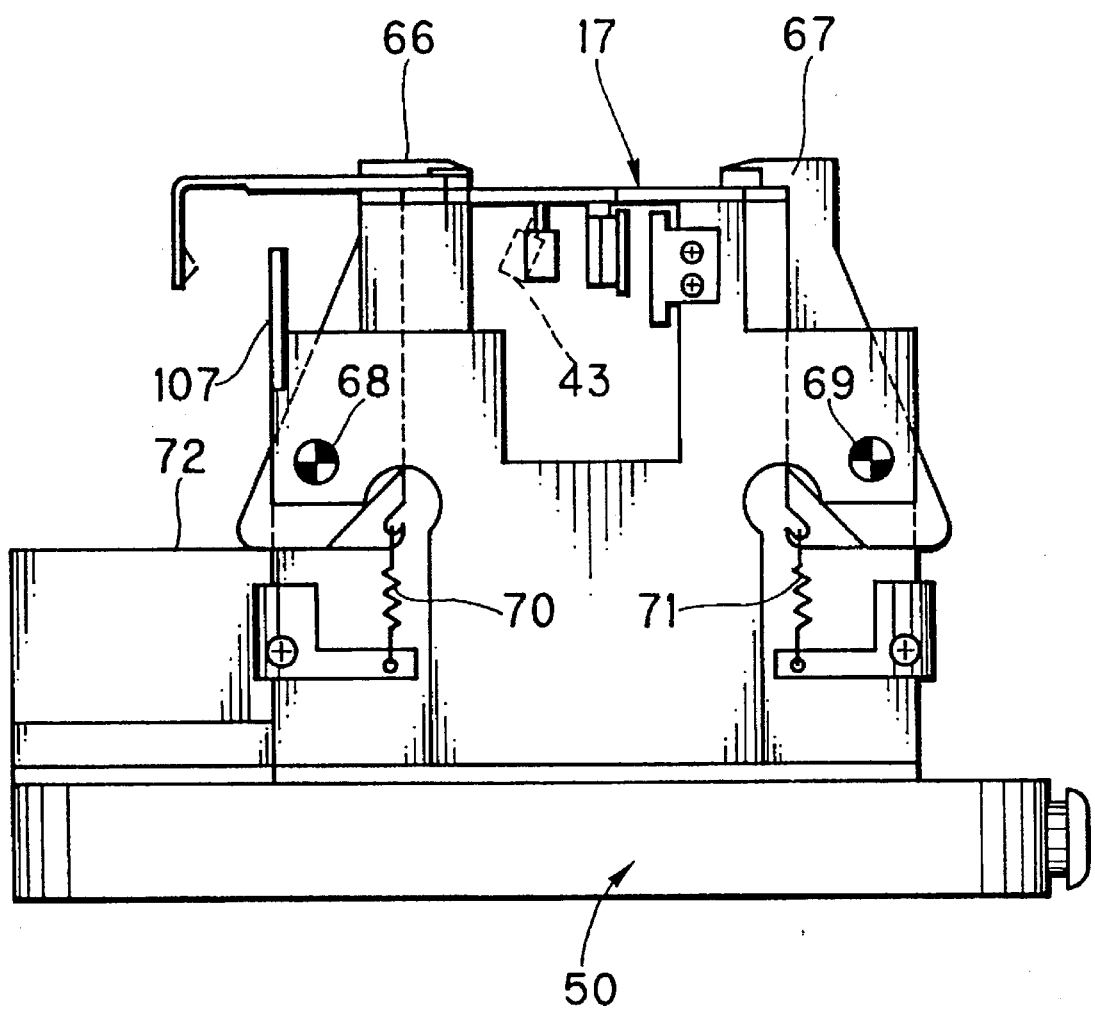
FIG. 7 is a schematic side view of the pallet shown in FIG. 6.

As shown in FIGS. 6 and 7, the inspection pallet 50 is provided with a pair of retaining hooks 66 and 67 for retaining the flash unit 17 in a horizontal posture with the protector 28 oriented upward and the main capacitor 37 oriented downward. At that time, the flash unit 17 is precisely positioned by a pair of positioning pins 48 and 49. The retaining hooks 66 and 67 are rotatable about axles 68 and 69, respectively. Springs 70 and 71 urge the retaining hooks 66 and 67 to rotate in opposite directions so as to retain or hold the flash unit 17. A mechanism for rotating the retaining hooks 66 and 67 against the force of the springs 70 and 71 is provided in each of the flash unit supply section 51 and the flash unit discharge sections 58 to 60, for placing the flash unit 17 onto or removing the same from the pallet 50.

Each pallet 50 is provided with an identification (ID) unit 72 having an optical communication system for data processing. The ID unit 72 can store career data, inspection data and other data of the flash unit 17 positioned on the associated pallet 50 and transfer these data to a computer 73 for data management, through light projecting and receiving windows 72a and 72b formed in the front of the ID unit 72.

Figure 8:
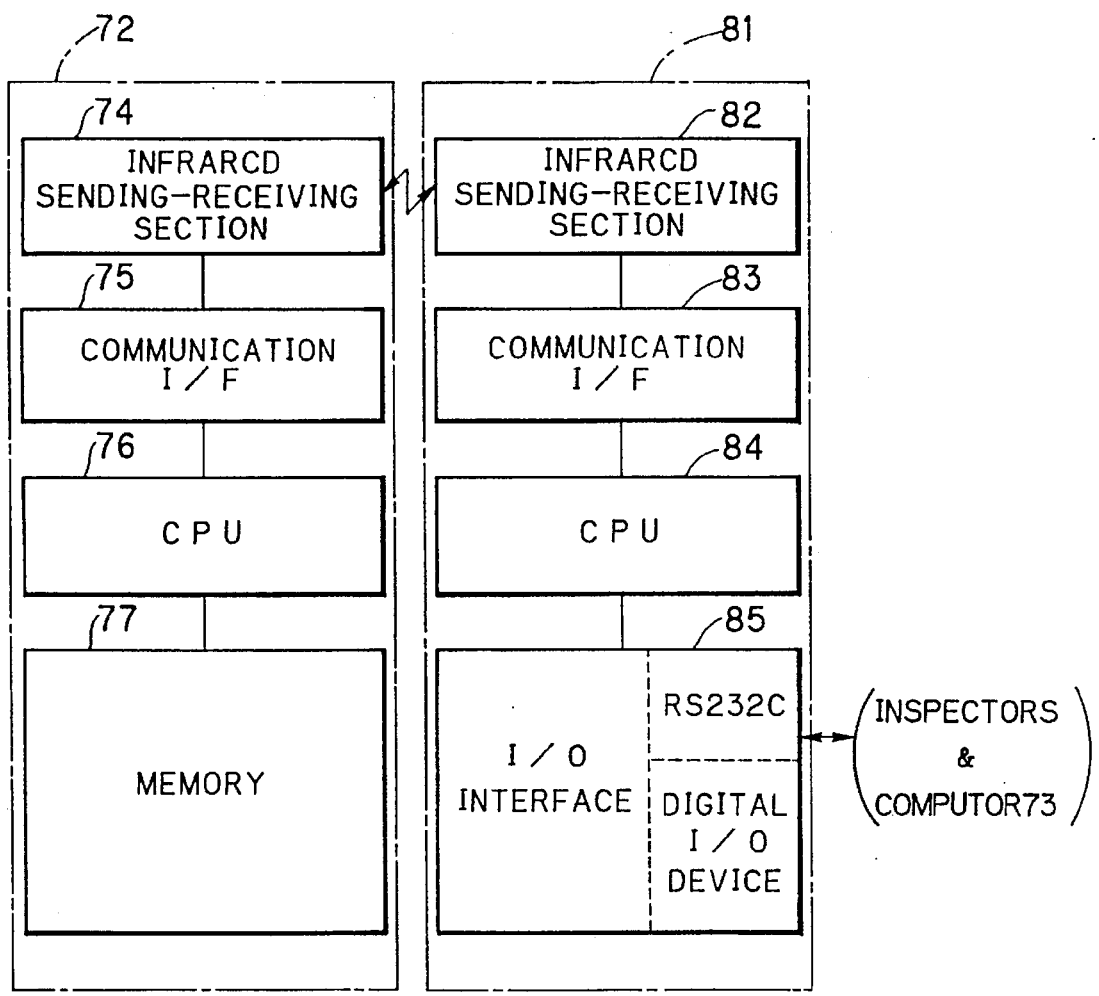
FIG. 8 is a block diagram of infrared ID units used for communication between the pallets and inspection devices and a computer in the inspection system shown in FIG. 5.

As shown in FIG. 8, the ID unit 72 has an infrared sending-receiving section 74 for data communication with the computer 73 or other devices through the light projecting and receiving windows 72a and 72b. The ID unit 72 further has a communication interface (I/F) 7, a CPU 76 and a memory 77. On the other hand, the computer 73 is connected to ID units 81 which are disposed on the inspection line for data communication with the ID unit 72. The ID unit 81 is comprised of an infrared sending-receiving section 82, a communication interface 83, a CPU 84 and an input-output (I/O) interface 85 including a digital I/O device, e.g., that is defined by the RS-232-C standard.

Figure 9:
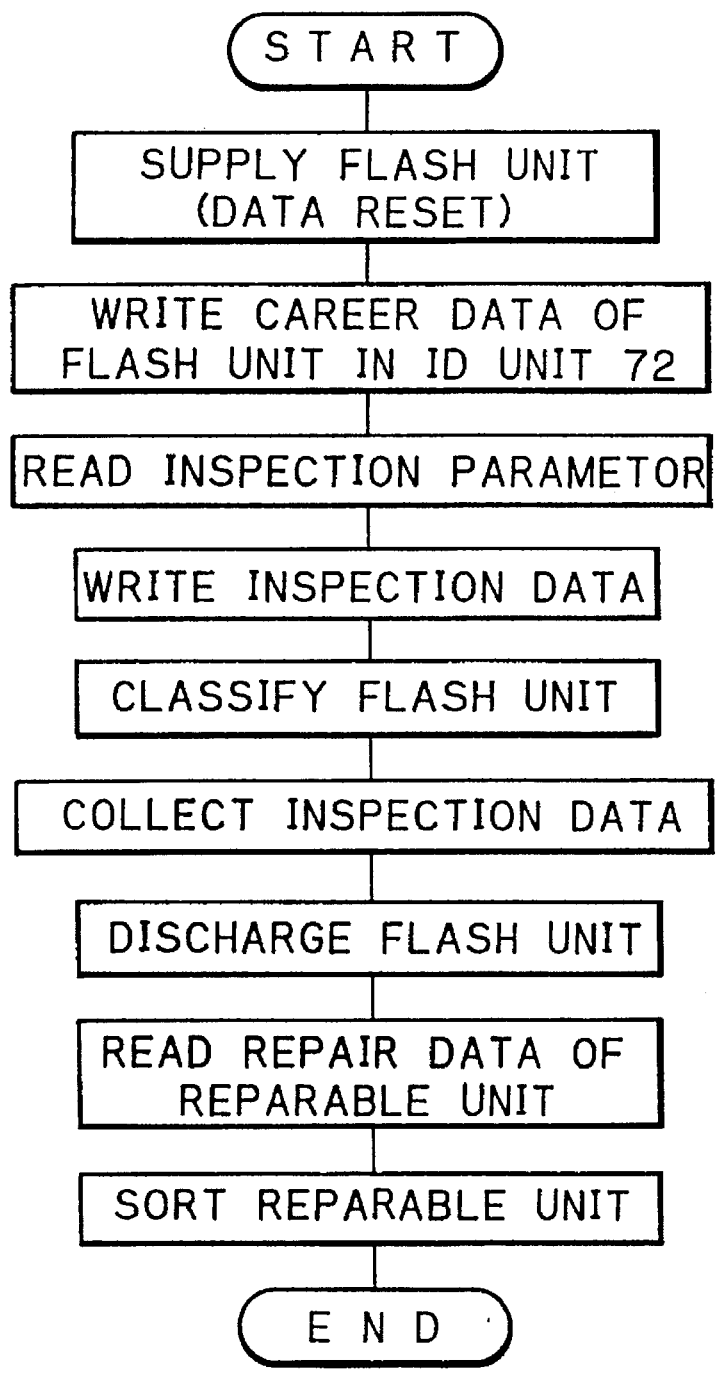
FIG. 9 is a flow chart illustrating an operation sequence of the inspection system shown in FIG. 5.

Now, the operation of the respective sections of the inspection line will be described with reference to the flow chart shown in FIG. 9.

In the flash unit supply section 51, the flash units 17 fed from the film package disassembling line 46 are seriatim held on the inspection pallets 50, while resetting all data stored in the ID units 72 by rewriting all memory locations with such failure data "F" that can never be detected from the flash unit 17 and would cause the flash unit 17 to be judged not-reusable. In this way, even if any inspection data should be unmeasured in the following inspection process or omitted from the memory 77 of the ID unit 72 by accident, for example, due to communication error or operation error, the associated flash unit 17 would not be regarded as reusable. By predetermining that the failure data "F" is also excluded from address data and inspection parameter data, the failure data "F" may be used as designation data for designating the pallet 50 to be discharged from the inspection line or subjected to the reinspection.

In the career data transfer section 52, data recorded on the recording portion 39, such as the date of production, the factory, the type of flash unit, the number of times of usage, the dates of permission to reuse, is read from the recording portion 39. In addition to these data, inspection parameter data, collection area data, result data from the disassembling line and other past data is transferred as career data to the ID unit 72. For example, the recording portion 39 is read by a reading device disposed in the career data transfer section 52. The reading device is connected to a control unit having the same ID unit as the ID unit 81, through which the data read from the recording portion 39 and other career data is transferred to the ID unit 72 of the corresponding pallet 50.

In the air cleaning section 53, air jets blow the dust from the flash unit 17. The protector cleaning section 54 is provided with a cleanser spraying device 91 and a cleaning head 95 having a cleaning tape 94 wound thereon. As shown in FIGS. 10A and 10B, the cleanser spraying device 91 sprays the protector 28 with cleanser liquid. Thereafter, when the pallet 50 moves under the cleaning head 95, the cleaning head 95 moves down to the protector 28 to bring the cleaning tape 94 into contact with the protector 28, and then vibrates in horizontal direction to wipe the outer surface of the protector 28.

In the appearance test section 55, six steps are performed such that inspection devices for the respective steps read the inspection parameter data from the ID unit 72 so as automatically to select appropriate test conditions. This process is necessary because there are a variety of flash units according to the type of film packages, and the flash units of different types usually have differently sized parts. In the first step, postures or deflections of the electric parts soldered to the printed circuit board 25 are inspected. This process is necessary for eliminating troubles in reassembling the flash unit 17 such as interference with another parts, that may be caused if any electric part has deflected. For example, inclination of the transistor 43 is measured by using a position sensor, e.g., optical position detector, to check if the transistor 43 is inclined or deflected from a proper position, as is shown by dashed lines in FIG. 7. Data from the position detector and other inspection devices is stored in the ID unit 72.

Figure 11:
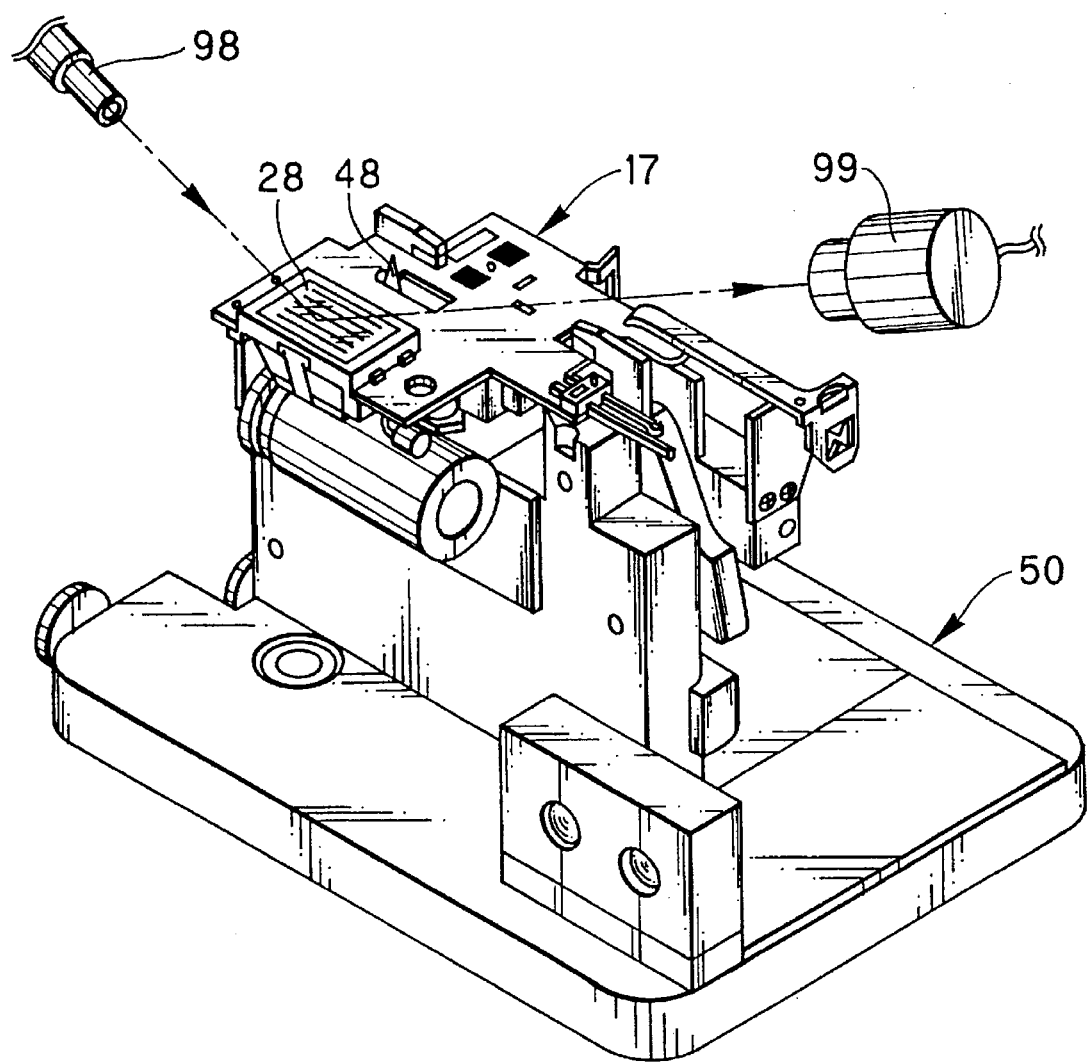
FIG. 11 is an explanatory view of a surface inspection device for a flash face of the flash unit.

In the second step, scratches and stain on the surface of the projector 28 is inspected. As shown in FIG. 11, the inspection device therefor illuminates the projector 28 by an optical fiber light 98 diagonally to the surface of the protector 28 to pick up reflected light by a CCD camera 99 disposed on opposite side from the optical fiber 98. Deflection of the reflected light angle is used for determining the scratches and stain. Then the total area of the scratches and stain is calculated and stored as area data in the ID unit 72.

Figure 12:
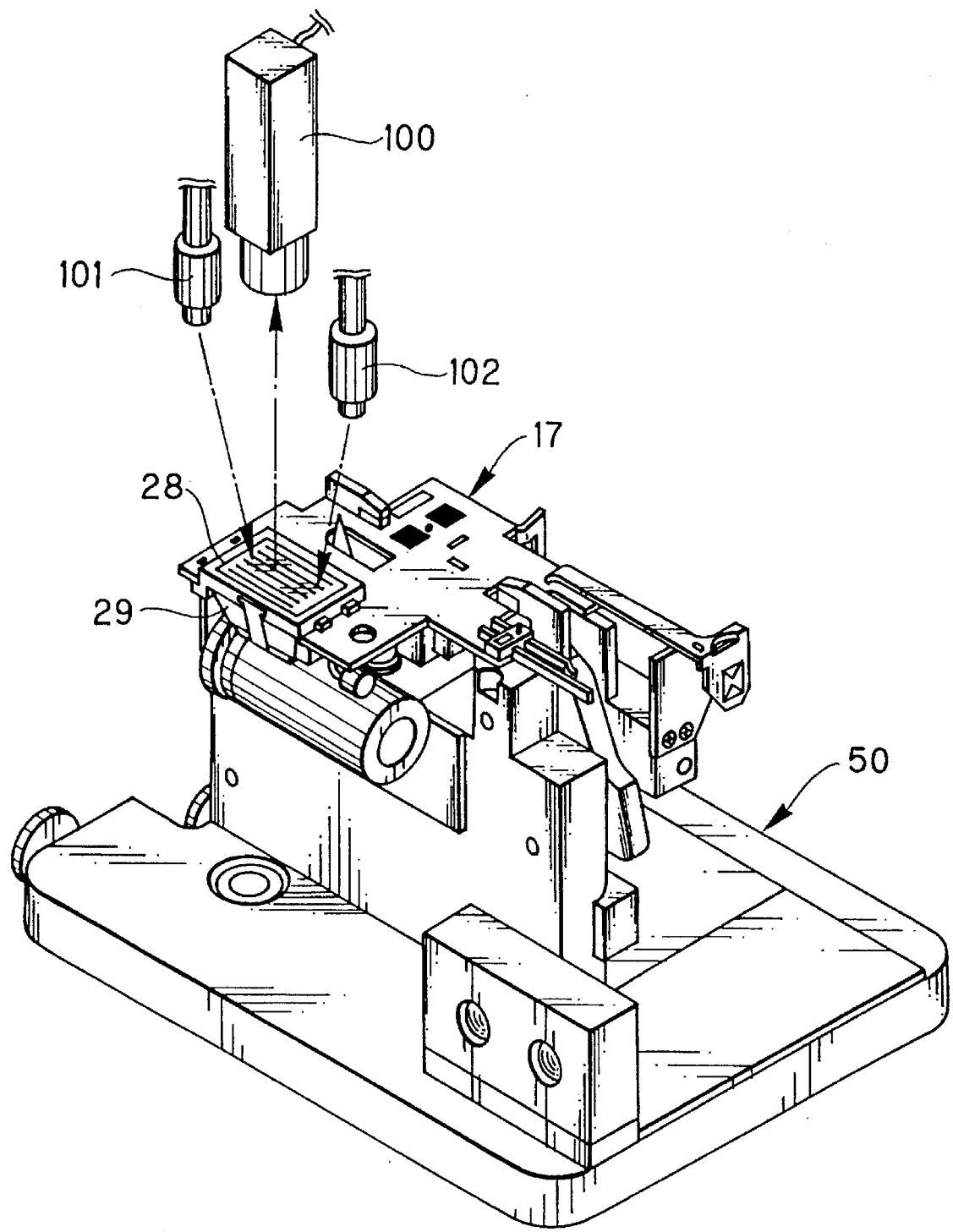
FIG. 12 is an explanatory view of a surface inspection device for a reflector of the flash unit.

In the third step, the reflection surface of the reflector 29 is inspected by using a CCD camera 100 disposed above the protector 28 and a pair of optical fiber lights 101 and 102 disposed on opposite sides of the CCD camera 100, as is shown in FIG. 12. The optical fiber lights 101 and 102 illuminate the reflector 29 through the protector 28, and the CCD camera 100 is focused on the reflection surface of the reflector 29 to pick up an image formed on the reflection surface. Based on luminance data of the picked-up image, the dust on the reflection surface is determined such that the image of the dust is roughly classified into white spots and black spots, and that the number of the white spots and that of the black spots are counted. The count data is stored in the ID unit 72.

Figure 13:
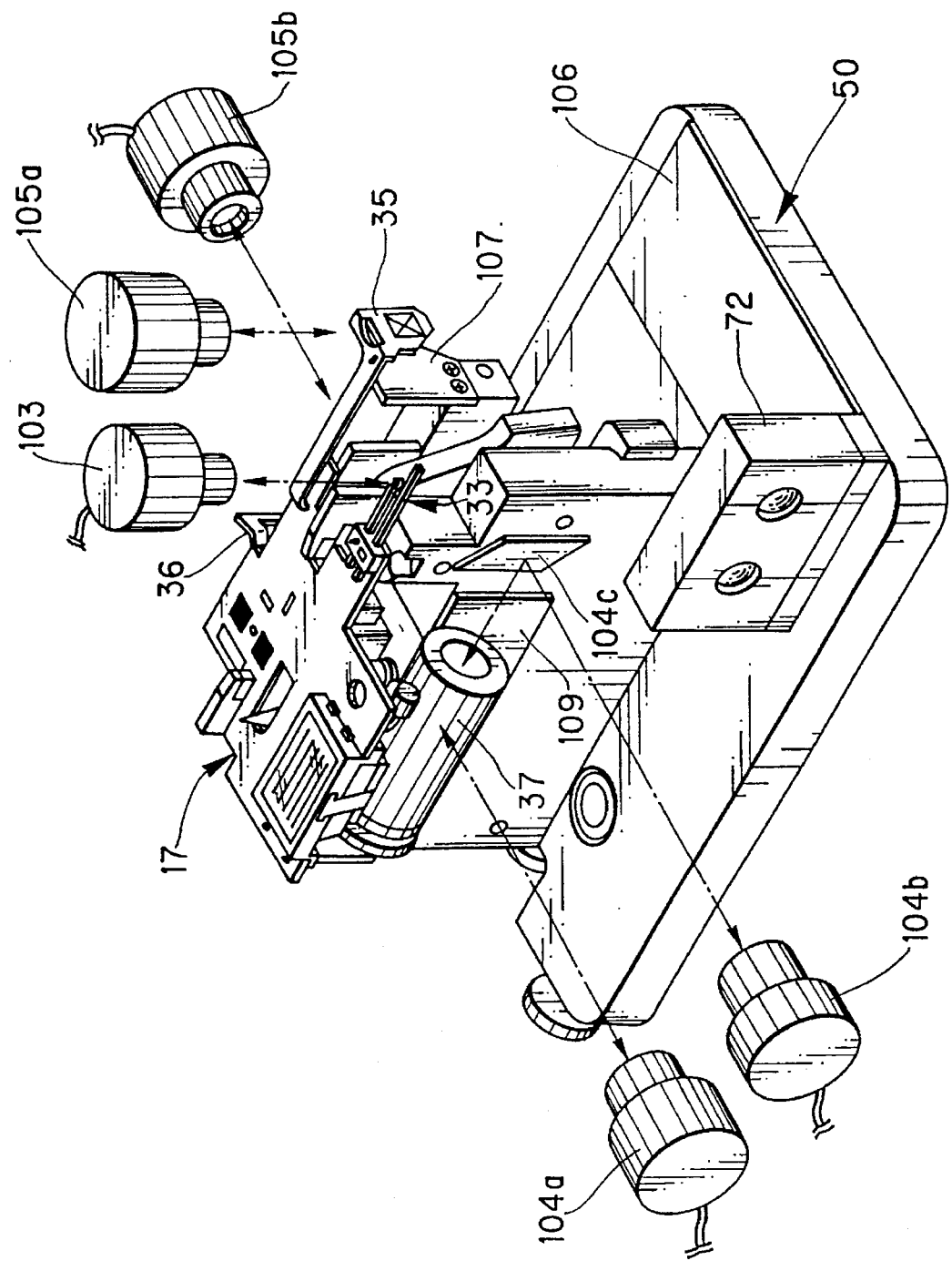
FIG. 13 is an explanatory view illustrating devices for inspecting deformation of electric parts of the flash unit.

The fourth step is to inspect deform of the contact strips 33a and 33b of the synchronizing switch 33. As shown in FIG. 13, a CCD camera 103 picks up an image of the distal end of the synchronizing switch 33 from an upper position, to derive position data of the distal ends of the contact strips 33a and 33b with respect to vertical and horizontal directions of the film package 2. The position data is compared with previously memorized reference data representative of normal position of the distal ends, so as to determine the distance between the actual position and the normal position.

In the fifth step, deform of the main capacitor 37 is inspected by picking up a front image and a side image of the main capacitor 37 by CCD cameras 104a and 104b, as shown in FIG. 13. A mirror 104c is used for reflecting the side image of the main capacitor 37 toward the CCD camera 104b. Data of these images is compared with normal image data by using the same dimension measuring method as used in the fourth step, to determine the distance between the actual position and the normal position two-dimensionally, that is, in vertical and horizontal directions of the film package 2.

In the sixth step, the electrode plates 35 and 36 for the battery 34 are photographed by CCD cameras 105a and 105b from the front and rear sides of the flash unit 17, to inspect the deform of the electrode plates 35 and 36 by using the above-described dimension measuring method. In this step, the distance from the normal position is determined three-dimensional. It is to be noted that the inspection pallet 50 is provided with white boards 106 to 109 in those positions which back the electric parts to be photographed while the flash unit 17 is held on the inspection pallet 50. The data obtained in the sixth step is stored in the ID unit 72. Thereafter, all data obtained through the appearance test is transferred from the ID unit 72 to the computer 73 through the ID unit 81 disposed in the appearance test section 55.

The flash units 17 that complete the appearance test are sent to the electrical inspection section 56 through the branching section 62 and the accumulating section 64, such that six inspection pallets 50 are simultaneously sent to the six electrical inspection apparatuses 61 of one channel when the number of inspection pallets 50 accumulated in the accumulating section 64 reaches six. Then, electrical inspection is carried out concerning contact resistance of the synchronizing switch 33, leak current through the battery electrode plates 35 and 36, charge time of the main capacitor 37, performance of the neon indicator 38, flash light amount, and many other items. Even through a quite many inspection items or steps are involved in the electrical inspection of the flash unit 17, since six flash units 17 are simultaneously inspected in each channel of the electrical inspection section 56, electrical inspection time per flash unit 17 is so shortened that it is possible to equalize the operation time for each inspection process.

Figure 14:
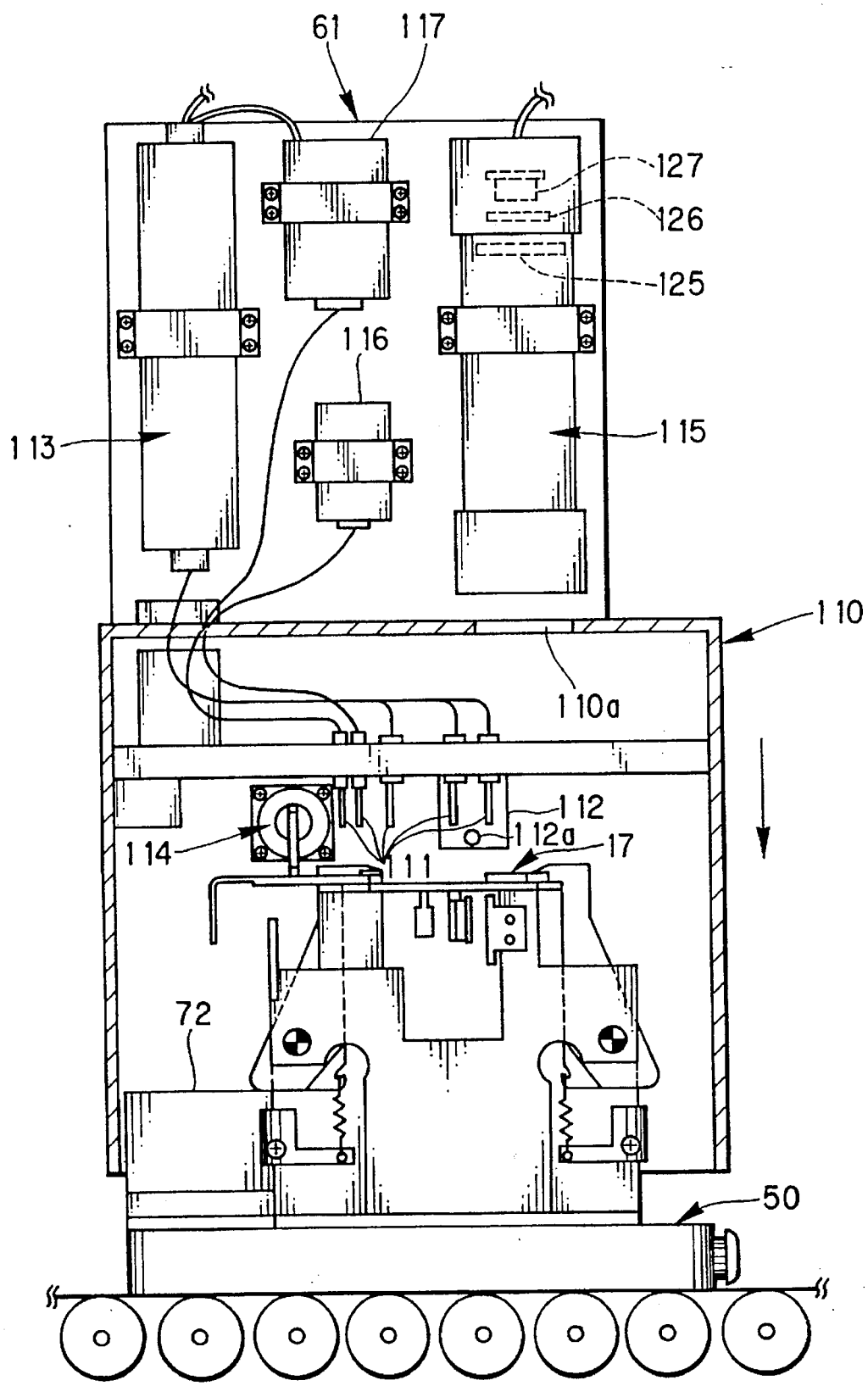
FIG. 14 is an explanatory view of an electrical inspection apparatus for inspecting electrical properties of the flash unit according to a preferred embodiment of the invention.

As shown in FIG. 14, the electrical inspection apparatus 61 is constituted of a light-shielding cover 110, proving pins 111 used for switching, power supplying and controlling of the flash unit 17, a neon emission detector 112, a controller 113, an actuator 114, a flash light measuring device 115, a constant voltage source 116 and a high D.C. voltage supply device 117. The proving pins 111, the neon emission detector 112 and the actuator 114 are securely mounted inside the light-shielding cover 110. The light-shielding cover 110 is provided for stopping the flash light emitted for the light amount measurement from affecting the results of inspection of adjacent flash units 17. When the pallet 50 is positioned in association with the electrical inspection apparatus 61, the light-shielding cover 110 is moved from a retracted position for uncovering the pallet 50 to an operative position for covering the pallet 50 with the flash unit 17, in a direction perpendicular to the conveying direction of the pallets 50.

The proving pins 111 are connected to the high D.C. voltage supply device 117, the constant voltage source 116 and the controller 113 through individual cables. Tips of the proving pins 111 are brought into contact with predetermined contacts on the printed circuit board 25 when the light-shielding cover 110 is in the operative position. Specifically, the proving pins 111 are adapted to contact with terminals 37a and 37b of the main capacitor 37, electrodes of the synchronizing switch 33, the charge switch contacts 26 and 27, and the (+, −) electrodes 35 and 36 for the battery 34.

Figure 15:
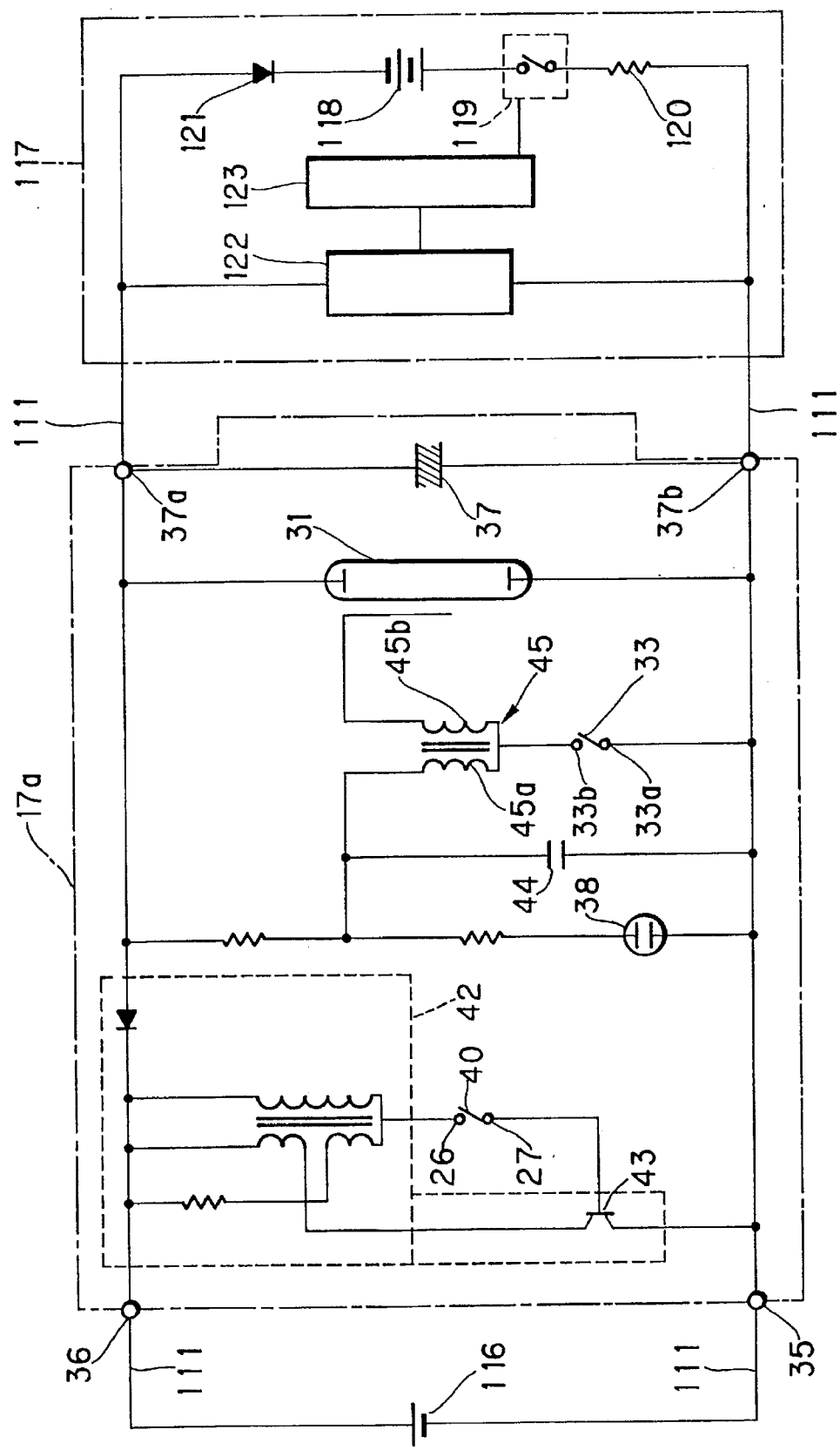
FIG. 15 is a circuit diagram of the flash unit connected to a constant voltage supplier and a high D.C. voltage supplier of the electrical inspection apparatus shown in FIG. 14.
Figure 16:
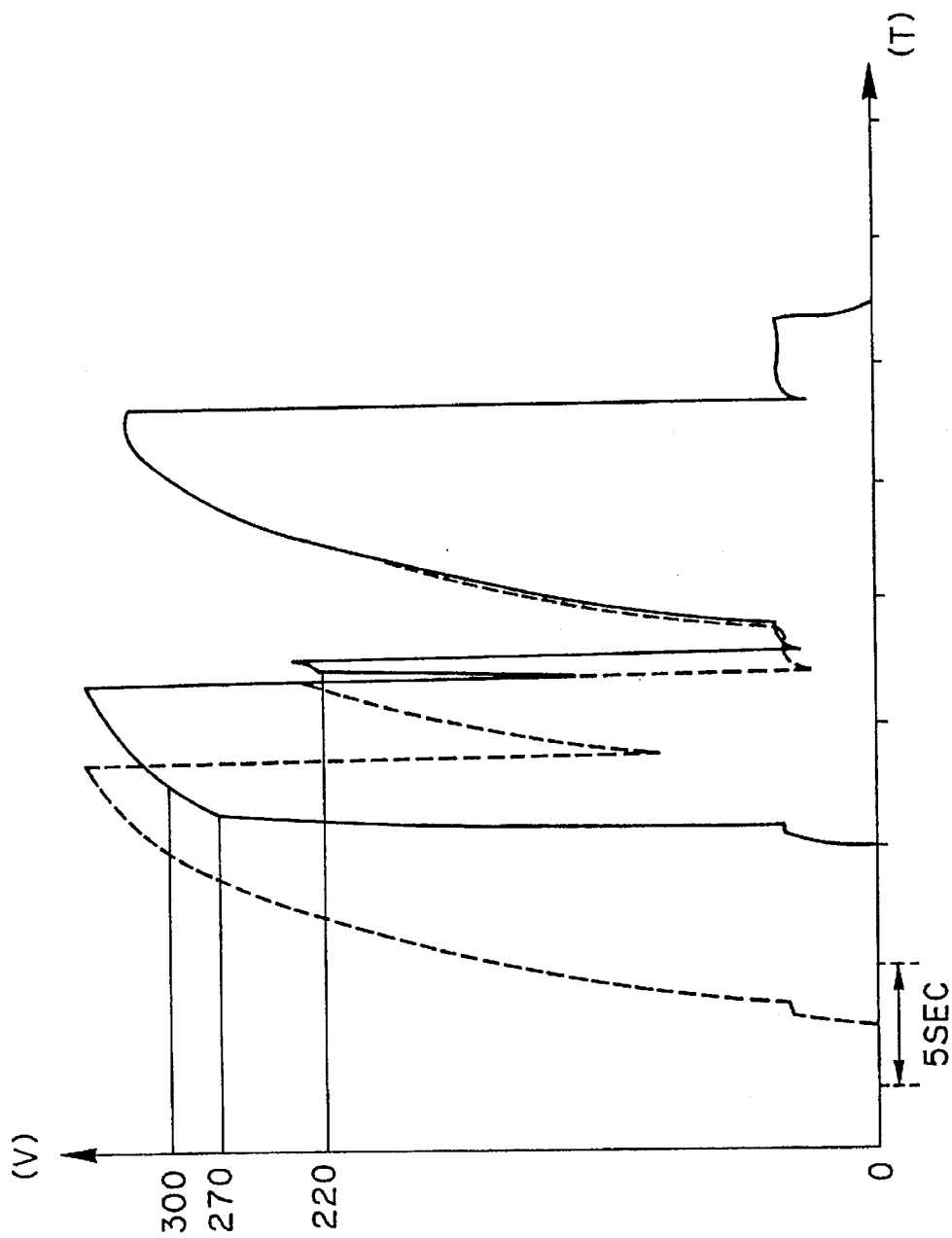
FIG. 16 is a graph illustrating curves of terminal voltage of the main capacitor of the flash unit during the electrical inspection.

FIG. 15 shows the circuitry of the flash unit 17 under the electrical inspection, wherein the battery electrodes 35 and 36 are connected to the constant voltage source 116 in place of the battery 34 through the proving pins 111. Also the terminals 37a and 37b of the main capacitor 37 are connected to the high D.C. voltage supply device 117 through the proving pins 111. The high D.C. voltage supply device 117 is adapted to directly supply the main capacitor 37 with a high D.C. voltage, e.g., 350 V, which is less than a withstand voltage of the main capacitor 37. The high D.C. voltage supply device 117 is constituted of a high D.C. voltage source 118, a switch 119, a current limiting resistance 120, a reverse current blocking diode 121, a voltage detector 122 and a switch driver 123. The voltage detector 122 continuously measures terminal voltage on the main capacitor 37 through the proving pins 111, so as to turn the switch 119 OFF through the switch driver 123 to terminate charging of the main capacitor 37 with the high D.C. voltage when the terminal voltage of the main capacitor 37 reaches a given voltage, e.g., 270 V, as is shown in a curve of FIG. 16 indicated by a solid line. It is to be noted that one scale of the horizontal axis of the graph represents five seconds.

Resistance value of the resistance 120 is predetermined considering the charge time, the source voltage of the high D.C. voltage source 118, circuitry of the high D.C. voltage supply device 117 and current capacity of the circuit of the flash unit 17. Providing that the high D.C. voltage is 300 V, the current capacity is 1A, the electrostatic capacity of the main capacitor 37 is 100 μF, and full charge voltage is 270 V, the value of the current limiting resistance 120 is set at 300 Ω, wherein the charge time is about 69 ms., due to transient phenomena in the resistance 120 and the main capacitor 37.

After the terminal voltage of the main capacitor 37 has reached 270 V and thus the high D.C. voltage supply is terminated, it takes about two seconds until the terminal voltage of the main capacitor 37 reaches 300 V if the main capacitor 37 is charged with only 1.6 V constant voltage from the constant voltage source 116. Accordingly, with the high D.C. voltage supply device 117, charging of the main capacitor 37 from 0 V to 300 V of its terminal voltage can be accomplished merely in 2.069 seconds or so. Since it takes about 7.5 seconds for charging the main capacitor 37 from 0 V to 300 V with 1.6 V constant voltage, as is shown by a curve drawn by dashed lines in FIG. 16, the high D.C. voltage supply device 117 contributes largely to saving the charge time.

The neon emission detector 112 is provided with a photo-sensor 112a or the like which is positioned near the neon indicator 38 when the light-shielding cover 110 is in the operative position, and outputs a detection signal to the controller 113 when the photo-sensor 112a detects light from the neon indicator 38. The flash light measuring device 115 is tsecurely mounted above an opening 110a formed through the light-shielding cover 110. The flash light entering through the opening 110a passes a diffusion plate 125 and an ND filter 126 and is received by a photo-diode 127 of the flash light measuring device 115. The photo-diode 127 outputs a signal to the controller 113.

Figure 17:
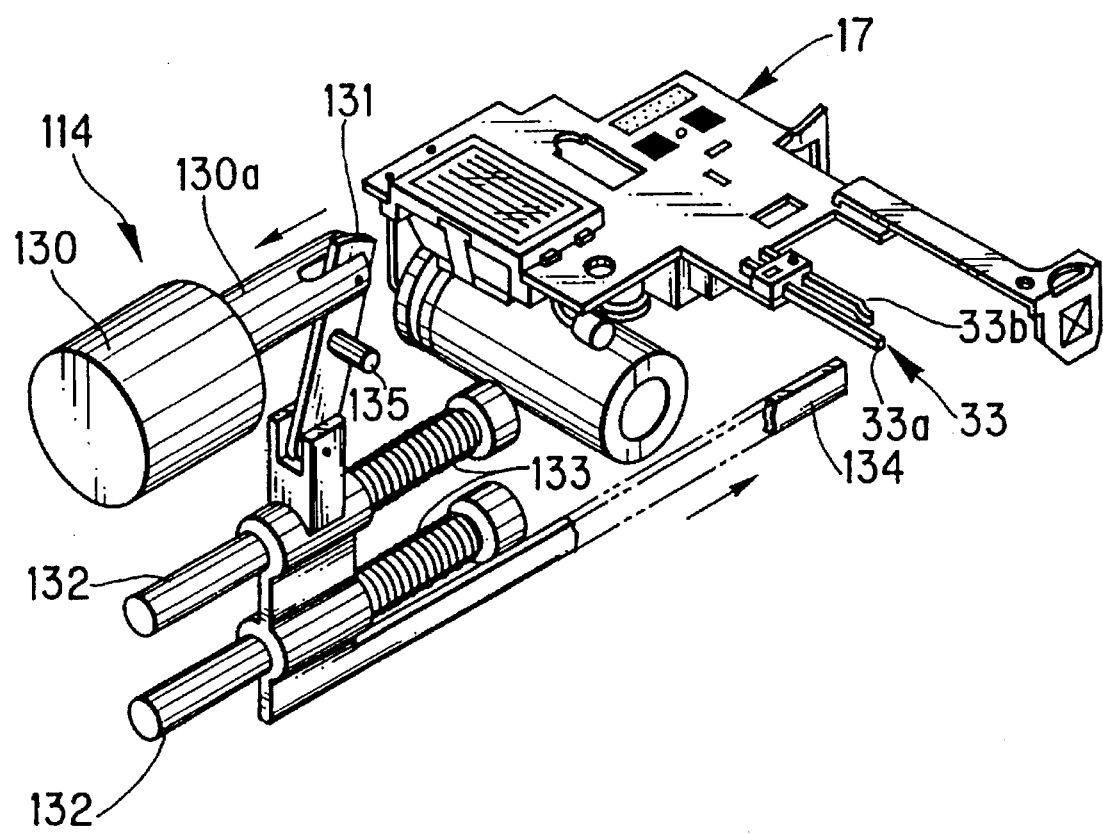
FIG. 17 is a perspective view of an actuator of the electrical inspection apparatus shown in FIG. 14.

As shown in FIG. 17, the actuator 114 is constituted of a solenoid 130, a connection plate 131 coupled to a plunger 130a of the solenoid 130, stationary guide rods 132, springs 133 mounted on the guide rods 132 and a striking stick 134 slidable along the guide rods 132. The actuator 114 is positioned near the synchronizing switch 33 when the light-shielding cover 110 is in the operative position, such that the striking stick 134 will strike the contact strip 33a of the synchronizing switch 33 when the controller 131 activates the solenoid 130 to rotate the connection plate 131 about an axle 135 in a counterclockwise direction against the force of the springs 133 which urge the striking stick 134 to remove from the synchronizing switch 33. The synchronizing switch 33 is thus turned ON by the striking stick 134.

The controller 113 measures the resistance, leakage, voltage or current between the contacts of each pair, and controls the actuator 114 and other devices of the inspection apparatus 61, according to a predetermined sequence. The controller 113 also accomplishes grouping of measurement data and compares the group values with predetermined threshold values, so as to make a judgment as to if it is acceptable, almost acceptable or non-acceptable with respect to each inspection item or step. The measurement data and the judgment data is transferred as inspection data to the ID unit 72 of the inspection pallet 50 through the ID unit 81 of each inspection apparatus 61. The inspection data is also transferred to the computer 73 through the ID unit 81.

Figure 18:
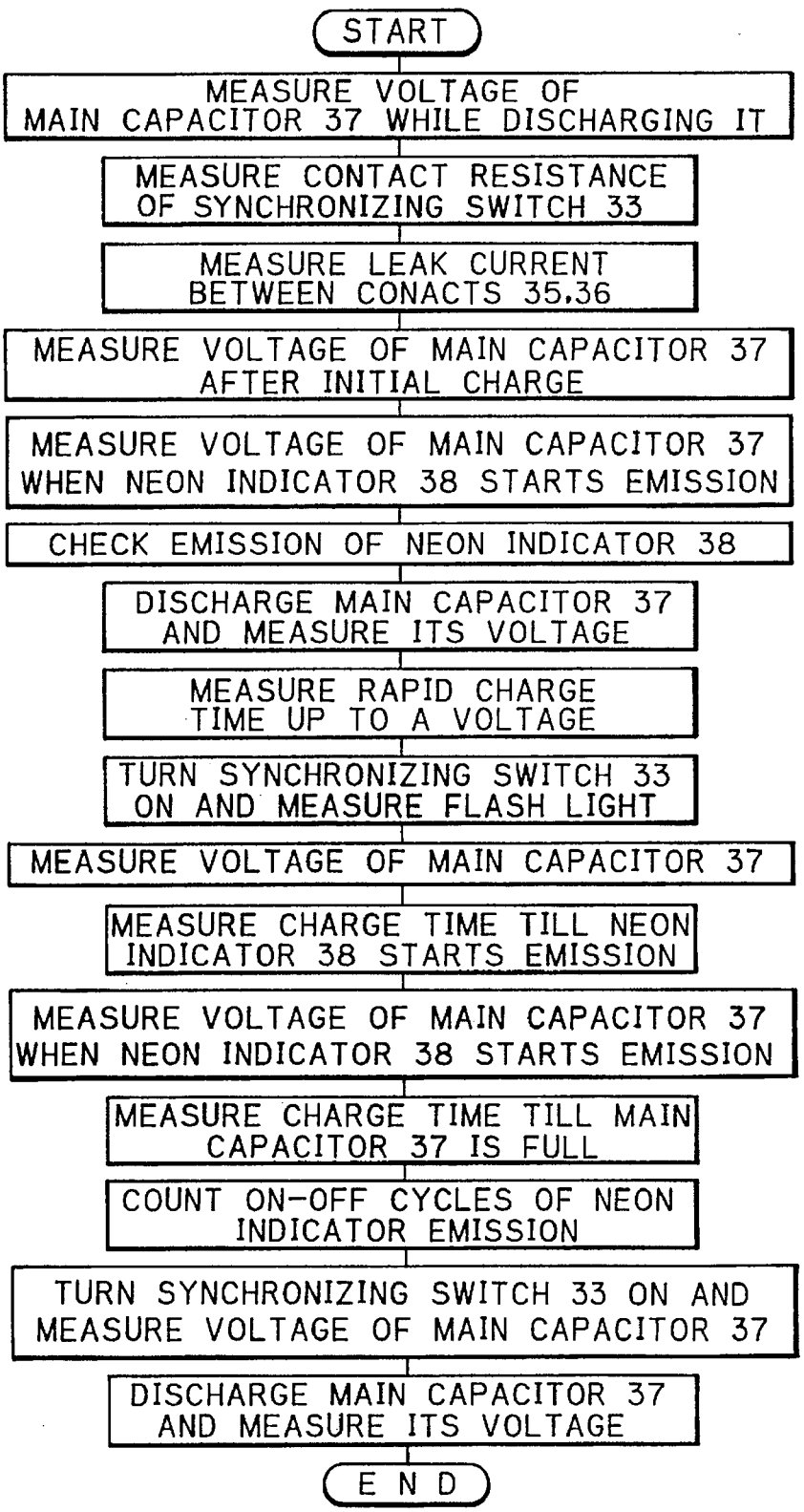
FIG. 18 is a flow chart illustrating the sequence of the electrical inspection.

The electrical inspection apparatus 61 measures the electrical properties of the flash unit 17 according to a sequence illustrated in FIG. 18. First, the main capacitor 37 is discharged, while measuring the voltage thereof. When the voltage goes below a given value, e.g., 2 V, the discharging is terminated 100 ms thereafter (step 1). If the voltage of the main capacitor 37 does not go below 2 V within a predetermined time from the start of discharging, it is judged unacceptable. Then, corresponding judgment data is transferred to the ID unit 72 and the computer 73, and the electrical inspection for this flash unit 17 is discontinued.

When the flash unit 17 passes the first step of the inspection, the actuator 114 is driven to measure contact resistance of the synchronizing switch 33 (step 2). The measurement is executed up to fifty times at intervals of 10 ms. For instance, if the measurement value is 2 Ω or more, the contact resistance is judged to be unacceptable. If all of the fifty measurement values are not less than 2 Ω, the actuator 114 is stopped, and the same process is executed once again. The number of times of the repetition of this process is changed according to a set value. As soon as an acceptable value of the contact resistance is detected, the inspection proceeds to the next step.

In the next step, leak current between the battery electrode plates 35 and 36 is measured (step 3), while applying 1.6 V to the electrode plates 35 and 36 as a test voltage. If the leak current is 1 μA or more, it is judged unacceptable. Thereafter, an initial charging of the main capacitor 37 is performed with 1.6 V for a given time, e.g., 500 ms, and measure the voltage of the main capacitor 37 (step 4). Unless the measured voltage is more than 30 V at that time, the flash unit 17 is disqualified. Continuously to the initial charging, the switch 119 of the high D.C. voltage supply device 117 is turned ON to apply the high D.C. voltage of 350 V directly to the terminals 37a and 37b of the main capacitor 37 for a rapid charging. Thereby, the time from the start of the rapid charging to the start of emission of the neon indicator 38, as well as the voltage of the main capacitor 37 at the start of neon indicator emission are measured (step 5).

Thereafter when the voltage detector 122 detects that the terminal voltage of the main capacitor 37 reaches a set value, that is, 270 V in this instance, the voltage detector 122 causes the switch driver 123 to turn the switch 119 OFF. Thus, the high D.C. voltage supply from the high D.C. voltage supply device 117 is terminated, but charging with 1.6 V from the constant voltage source 116 is continued for a time, e.g., 2 seconds from the first detection of the neon indicator emission, so as to determine if the neon indicator 38 continues to emit light intermittently during the later charge time with 1.6 V (step 6). Next, the main capacitor 37 is discharged for 100 ms, and then, the voltage of the main capacitor 37 is measured to determine if it is less than a predetermined value, e.g., 230 V (step 7). If it is not less than 230 V, the flash unit 17 is judged unacceptable. Thereafter, the switch 119 is again turned ON to effect the rapid charging, for measuring a rapid charge time from the start of charging to a time when the voltage of the main capacitor 37 reaches a predetermined voltage, e.g., 220 V (step 8). If the rapid charge time is not less than 8 seconds, the flash unit 17 is disqualified.

Thereafter, the actuator 114 is driven for 10 ms to turn the synchronizing switch 33 ON, while the controller 113 monitors the signal from the flash light measuring device 115 to determine if the light amount is above a predetermined level (step 9). Furthermore, the voltage of the main capacitor 37 after the flashing is checked as to if it is below a predetermined level, e.g., 70 V (step 10). If not, the flash unit 17 is disqualified. Then, the main capacitor 37 starts to be charged again with 1.6 V from the constant voltage source 116, for checking if the neon indicator 38 starts emitting in a predetermined time (step 11). For example, if the neon emission detector 112 does not output a signal within 8 seconds after the start of charging, the flash unit 17 is disqualified. Also the voltage of the main capacitor 37 at the start of emission from the neon indicator 38 is measured (step 12). If the voltage is not included in a range, e.g., from 280 V to 310 V, the flash unit 17 is disqualified. The charging with 1.6 V is continued so as to determine if the voltage of the main capacitor 37 reaches a given voltage, e.g. 310 V, within a given time, e.g. 10 seconds, from the start of the charging (step 13). Simultaneously therewith, the number of ON-OFF cycles of the neon indicator 38 is counted (step 14). For example, if the cycle is not less than 17 counts per second, the flash unit 17 is disqualified.

Thereafter, the actuator 114 is driven to turn the synchronizing switch 33 ON to effect flashing. If the voltage of the main capacitor 37 after the flashing is not less than a given level, e.g. 70 V, the flash unit 17 is disqualified (step 15). Finally, the main capacitor 37 is discharged for a given time, e.g. 2 seconds. If the voltage thereafter is not less than a given level, e.g. 5 V, the flash unit 17 is disqualified (step 16). The electrical inspection is discontinued whenever the voltage of the main capacitor 37 goes beyond a given level, e.g. 350 V. Of course, the flash unit 17 is disqualified at that time.

As described above, the measurement data and the judgment data obtained through the electrical inspection section 56 is stored in the ID unit 72 of the individual inspection pallet 50, and is transferred concurrently to the computer 73 through the ID unit 81, after the measurement data is grouped in each inspection apparatus 61.

Grouping of measurement data is made not only in the electrical inspection apparatus 61 but also in other inspection devices before inspection data is transferred to the ID unit 72 through the ID unit 81. The grouping is made according to the following equation:

$$Ln = INT(An \times Xn + Bn)$$

wherein

Ln represents a group value;

An represents a gain;

Xn represents raw data of measurement values;

Bn represents a biasing value;

INT represents integration of real number (omission, raising or rounding of decimal part)

The gain An is used mainly for dealing with area data, and is usually set at a value more than "1". However, in case where only dimension data is to be dealt with, as in the present embodiment, the gain An is set at "1". The biasing value Bn is used mainly for dealing with dimension data, and is set at "20" in the present embodiment. For example, when the raw measurement data is 3.456 mm, and INT represents rounding, the group value Ln is obtained as follows:

$$Ln = INT(1 \times 3.456 + 20)$$

$$= INT(23.456)$$

$$= 23$$

The grouping compresses the measurement data to be transferred, and hence saves the transfer time, and also facilitates judgment of the measurement data with reference to threshold values.

The computer 73 collects the data from the electrical inspection section 56 and those from the appearance test section 55 so as to judge the flash unit 17 in the over-all results of the inspection, and compiles the data for allowing to show the data in statistics and graphs, as shown, for example, in FIGS. 19 to 22. Since the data is grouped as set forth above, frequency distribution charts or graphs can be obtained with ease by cumulating the number of those data which has the same group values. These table and graphs may be optionally displayed on a CRT monitor 138 connected to the computer 73, while the data being updated in real time in an on-line mode.

For example, when a menu "itemized cumulation of rejection" or "percentage data" is selected from various menus which can be displayed on the CRT monitor 138, a table of itemized cumulation of rejection or a table of percentage data is displayed as shown in FIGS. 19 or 20 on the CRT monitor 138 through in the on-line mode. FIG. 19 shows an example of the table of the cumulative number of rejected or disqualified flash units 17 with respect to each electrical inspection step. The number may be cumulated from the start of a programmed control time or the last manual reset time. FIG. 20 shows an example of the table of the percentage of rejection or disqualification.

It is to be noted that the data is shown with respect to eight channels in the tables of FIGS. 19 and 20. This means that the electrical inspection section 56 is provided with eight parallel channels in this instance. "NG" marks displayed under the channel number "3" and "5" indicate that the third and fifth channels got NG judgment in the last inspector, while "OK" marks under the other channel numbers indicate that the first, second, fourth and sixth to eighth channels got OK judgment in the last inspection.

Figure 22:
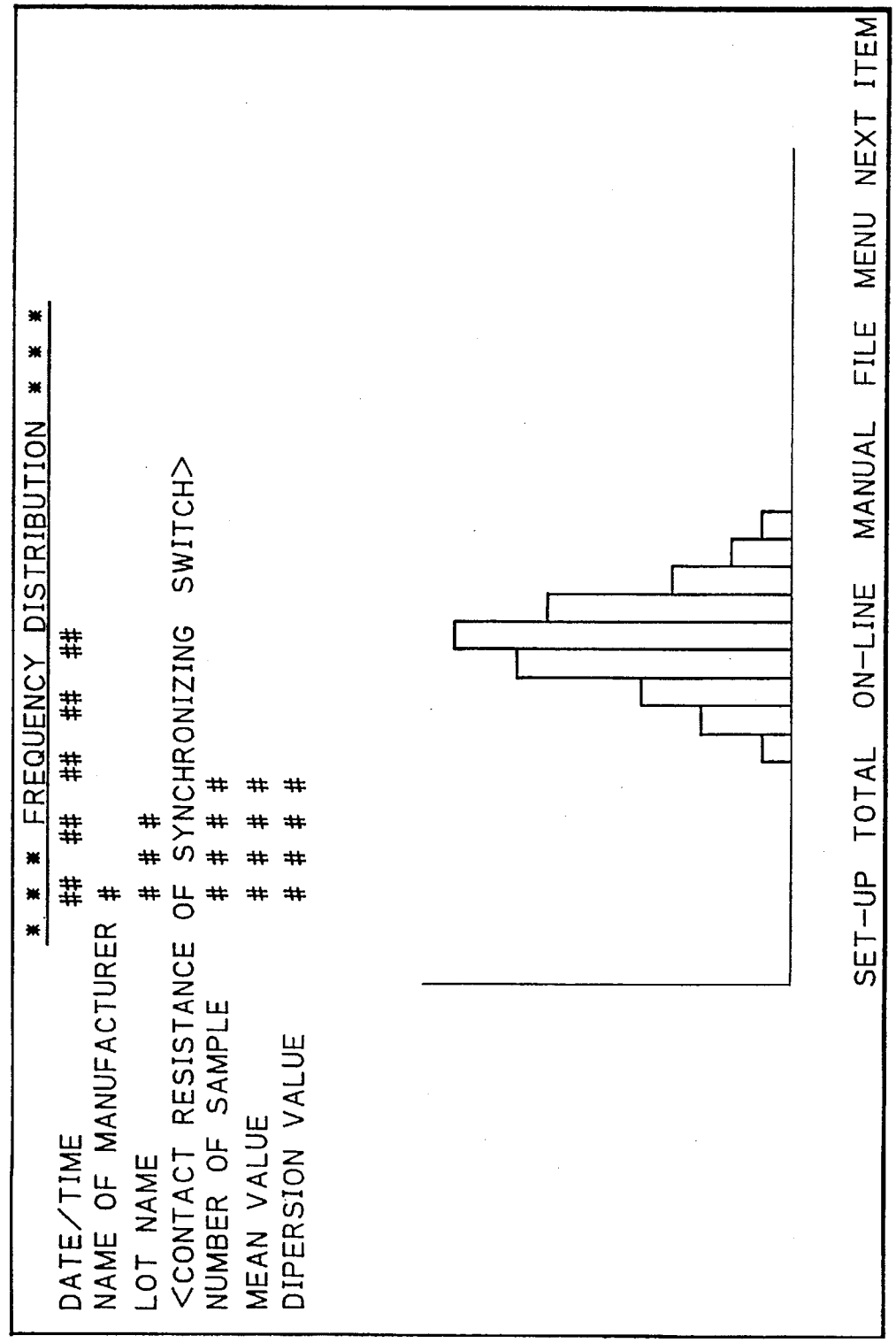

It is also possible to display a judgment data table for all inspection items for each inspection item of the electrical inspection, for example, as shown in FIG. 21. It is of course possible to display the measurement data of several items in a time sequential manner on a table, e.g. ten items including "contact resistance of the synchronizing switch 33", "leak current between the battery electrodes 35 and 36", "initial charge voltage", "flash light amount", "charge times (at four points)", "neon turn-on voltage (the voltage of the main capacitor 37 at the start of emission from the neon indicator 38)", "ON-OFF cycles of neon indicator 38". It is further possible to display a frequency distribution graph for each of the above-mentioned ten items, based on the measurement data collected for each manufacturer by each lot, as shown in FIG. 22 with respect to the contact resistance of the synchronizing switch. These table and graphs are preferably utilized for marketing analysis.

The inspection pallets 50 holding the flash units 17 are transported from the electrical inspection section 56 to the career recording section 57 while being rearranged in a line through the accumulating section 64 and the joining section 63. Meanwhile, the computer 73 process and compile the transferred data. The computer 73 classifies the flash units 17 into four classes: "reusable", "reparable", "not-reusable" and "to-be-reinspected", depending on the judgment data of all inspection items. Then, the computer 73 transfers the classification data to the ID unit 72 of the corresponding inspection pallet 50 through an ID unit 81 disposed in the career recording section 57. Simultaneously with the recording of the classification data in the ID unit 72, a recording head of the career recording section 57 is activated to record career data representative of the number of times of reuse and the date of permission to reuse directly on the recording portion 39 of those flash units 17 which are judged reusable.

According to this embodiment, only those flash units 17 which have passed all inspection steps are judged reusable in the all-over result. If it is determined that at least a part needs repairs but other parts are acceptable, the flash unit 17 is judged reparable. If the flash unit 17 is disqualified in any one of the inspection steps, the flash unit 17 is judged not-reusable. If no data can be detected in any of the inspection steps, the flash unit 17 is judged to be reinspected. However, it is possible to classify the flash units 17 into three classes omitting the class "to-be-reinspected".

The computer 73 also writes all of the transferred data in a data base. The data base may be utilized for quality data of each article by statistically processing it in an off-line mode, or for lot data by cumulation, as well as for preparing the above-described frequency distribution table or graph.

Next to the career recording section 57, the flash unit 17 is transported to the reusable unit discharge section 58, wherein only those flash units 17 which are judged reusable are discharged according to the classification data stored in the corresponding ID units 72. The discharged flash units 17 are accumulated in a reusable unit storage section 140 up to a predetermined amount, and thereafter supplied to the film package assembling line 47.

The remaining flash units 17 are transported to the reparable unit discharge section 59, wherein those flash units 17 which are judged reparable are discharged, and accumulated in a reparable unit storage section 141 wherein the flash unit 17 is transferred from the inspection pallet 50 to a tray. The tray has the same ID unit as the ID unit 72, so that all data stored in the ID unit 72 of the inspection pallet 50 is transferred to the ID unit 72 of the tray.

The flash units 17 stored in the reparable unit storage section 141 are sorted according to which part needs repairs with reference to the data stored in the ID units 72 of the trays. The sorted flash units 17 are automatically accumulated by each group in a sub-storage section 142. Subdividing the reparable flash units 17 into those groups which correspond to the inspection items may be possible but impractical, since there may be a quite many number of, e.g., more than 8000 inspection items. To sort the flash units 17 according to the part to be repaired needs merely five to twelve divisions, and is still convenient enough to repair. The flash units 17 are then sent from the sub-storage section 142 to the repair section 143. The flash units 17 thus repaired are fed back to the flash unit supply section 51, to be reinspected through the inspection line. If the flash unit 17 has passed all inspection steps, it is fed to the film package assembling line 47.

The flash units 17 that remain undischarged in the reparable unit discharge section 59 are transported to the rejected unit discharge section 60, wherein those flash units 17 which are judged not-reusable are discharged and stored in a rejected unit storage section 144 up to a predetermined amount. Thereafter, the not-reusable flash units 17 are discarded. The flash units 17 remaining undischarged even in the rejected unit discharge section 60 are returned to the flash unit supply section 51 through the circulating inspection line, for the reinspection.

Figure 23:
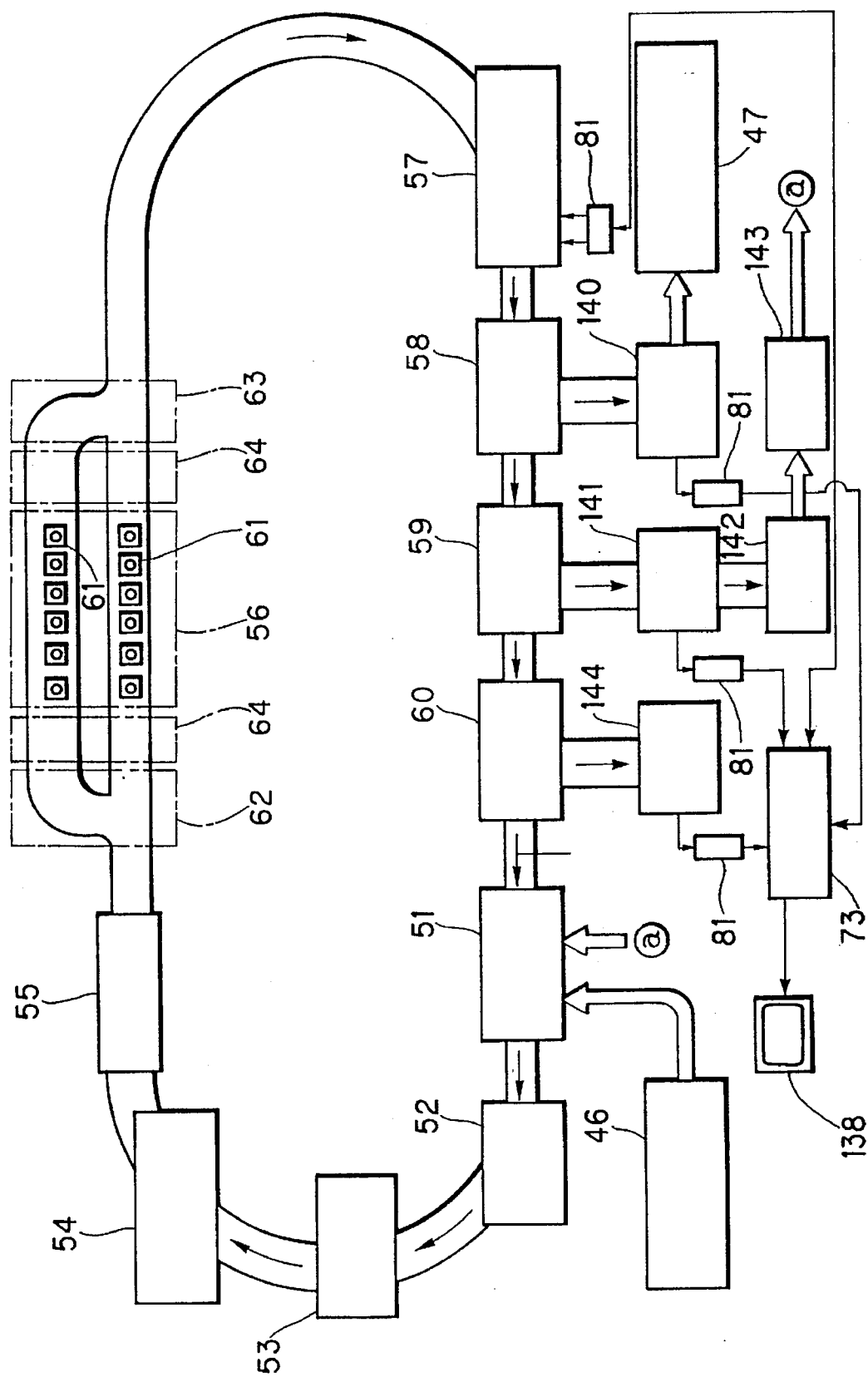
FIG. 23 is an inspection system for the flash unit, according to another preferred embodiment of the invention.

Although the above-described embodiment make the judgment for each inspection item in each inspection device, and the judgment data and measurement data is transferred to the computer 73, it is possible to store only measurement data in the ID unit 72 and, after the flash unit 17 goes through all inspection steps, transfer the measurement data at once from the ID unit 72 to the computer 73 so as to make the judgment for each inspection item with reference to threshold values stored in the computer 73, and the classification of the flash units 17 in the over-all result. FIG. 23 shows an inspection system for such an inspection method, wherein each inspection device and station of the inspection line has an ID unit 81 for data communication with an ID unit 72 of an inspection pallet 50, through some of those ID units 81 are not shown for clarity. In FIG. 23, the same reference numerals designate the same or equivalent sections as in FIG. 5, so that the following description of the second embodiment will relate to the essential matter thereof.

A computer 73 reads out all group values as the measurement data from the ID unit 72 of the inspection pallet 50 which is positioned in a career data recording section 57, so as to derive judgment data as to the flash unit 17 on that inspection pallet 50 with respect to the respective inspection items, and then classifies the flash unit 17 depending on the over-all judgment data. The judgment data and classification data is transferred from the computer 73 to the ID unit 72. Simultaneously with the recording of the judgment data and the classification data in the ID unit 72, a recording head of the career recording section 57 is activated to record career data representative of the number of times of reuse and the date of permission to reuse directly on the recording portion 39 of those flash units 17 which are judged reusable.

Figure 25:
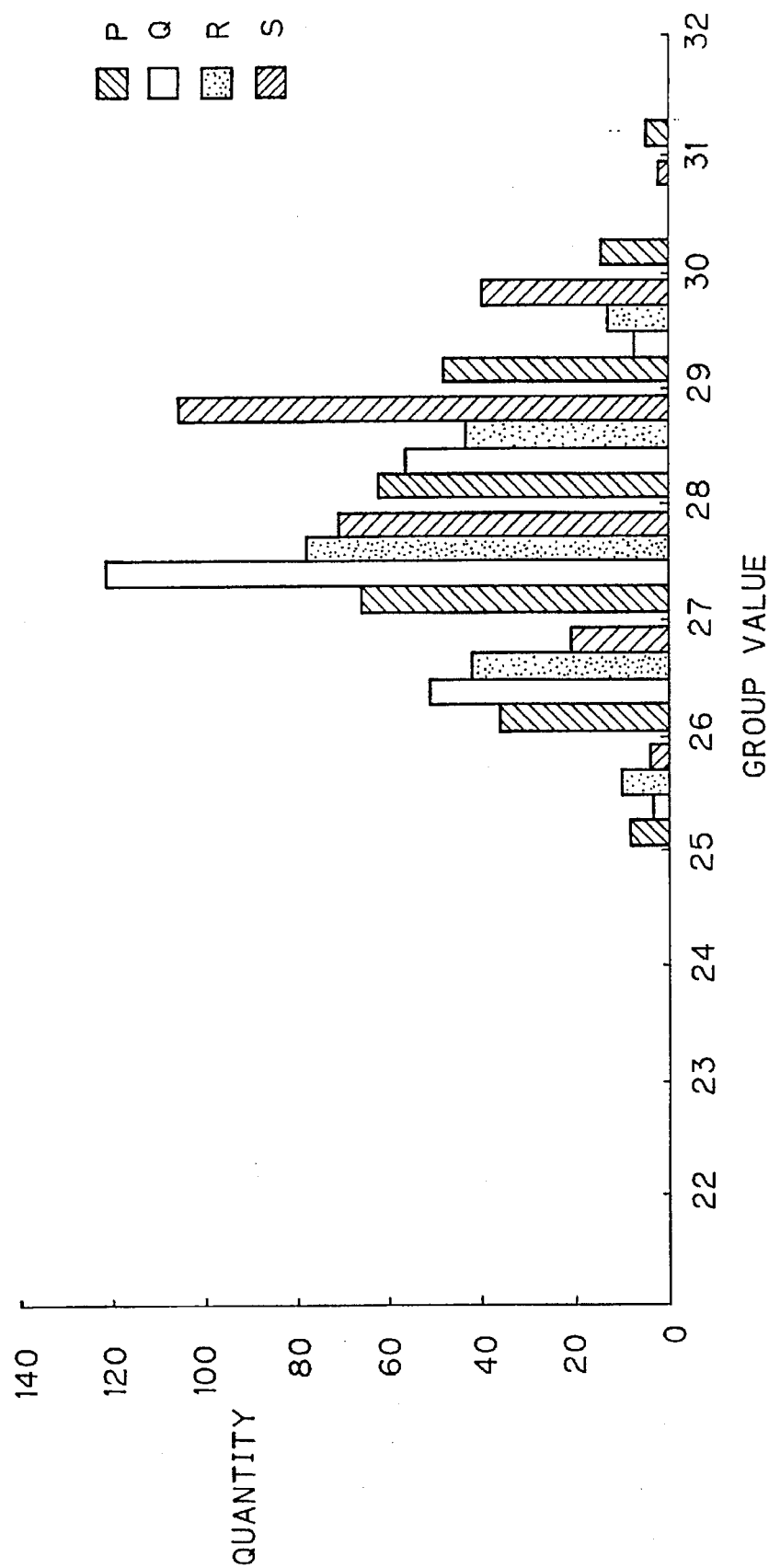
FIG. 25 is a graph illustrating the occurrence of each group value for each kind of flash unit.
Figure 26:
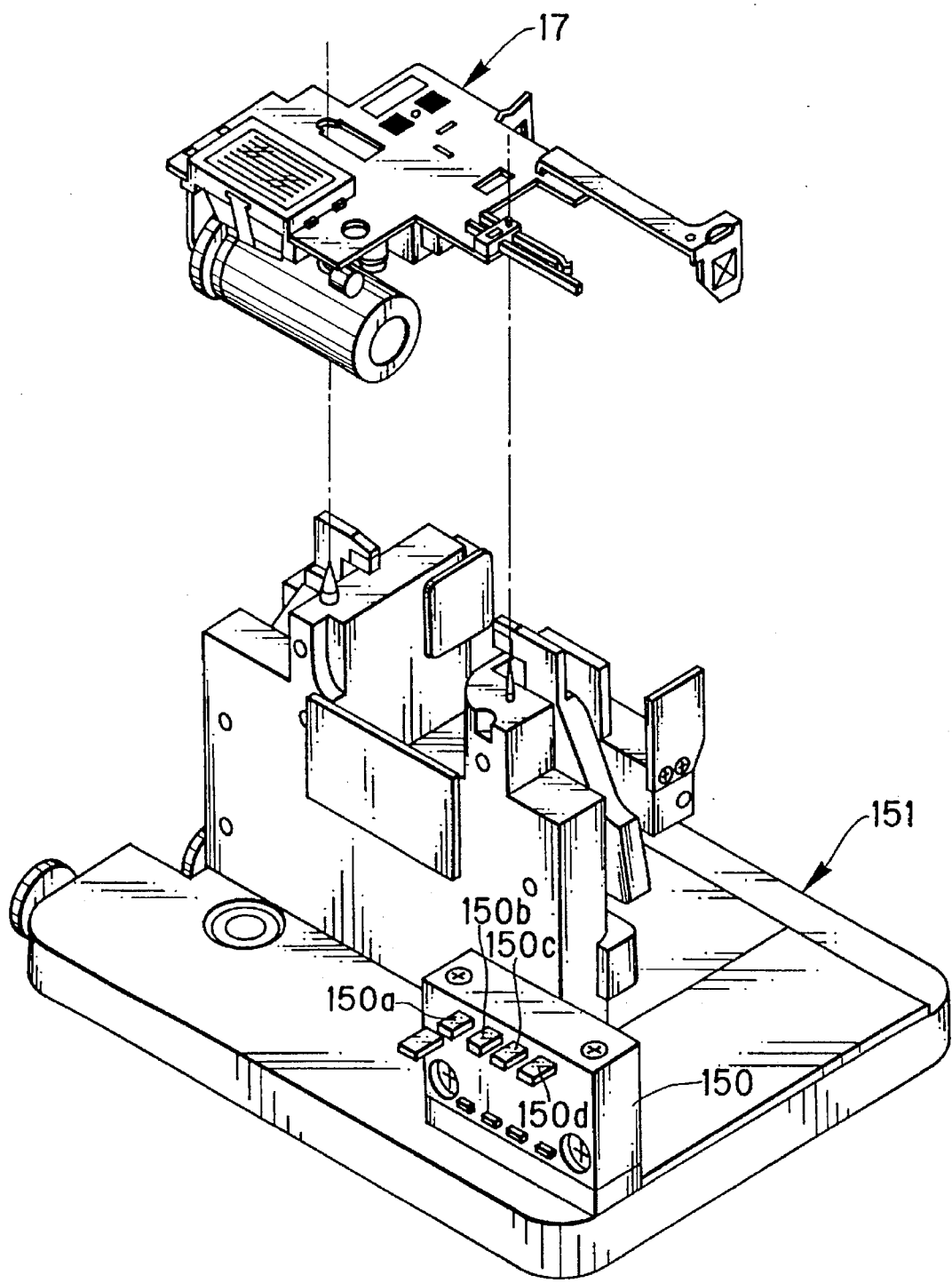
FIG. 26 is a perspective view of a pallet having a classification code indicator according to another embodiment of the invention.

The computer 73 also cumulates the same group values for each inspection item, so that a frequency distribution table or graph of the group values can be provided and displayed in real time in the on-line mode, for example, as shown in FIGS. 24 or 25, respectively.

In FIG. 24, A to L represent the respective inspection items, such as, postures of the electric parts, scratches on the protector 28, stain on the protector 28, stain on the reflection surface of the reflector 29 (white spots), stain on the reflection surface of the reflector 29 (black spots), deform of the synchronizing switch contacts 33a and 33b (horizontal), deform of the synchronizing switch contacts 33a and 33b (vertical), deform of the main capacitor 37 (horizontal), deform of the main capacitor 37 (vertical), and deform of the battery electrode plates 35 and 36 (three-dimensional). Numerical values in the cells or segments of the each column represent the numbers of occurrence or appearance of the respective group values indicated in the leftmost column, but the numerical value indicated in the uppermost cell of each column represents the number of those flash units 17 from which data is unmeasured with respect to the inspection item of that column.

Judgment data is provided by comparing the group values with threshold values which are predetermined for each individual inspection item, as indicated by double-lines in FIG. 24. Specifically, the numbers of "unmeasured" cases indicated in the first row above a double-line $\alpha$ correspond to the number of the flash units judged to be reinspected. In each inspection item, a group value range from the double-line $\alpha$ (or from the group value "1") to a double-line $\beta$ corresponds to the reusable cases, and a group value range from the double-line $\beta$ to a double-line $\Gamma$ corresponds to the reparable cases, while a group value range beyond the double-line $\Gamma$ corresponds to the not-reusable or disqualified cases. Each numerical value indicated in the second row from the bottom represents the sum of those flash units which are disqualified or judged to be reinspected, hereinafter referred to as NG number. Percentages of the bottom row represent NG rates, that is, the rates of the respective NG numbers to the total input. For instance, in the inspection item A, the NG rate is 2.59%, and the NG number "37" corresponds to the number of the to-be-reinspected flash units since there is no disqualified case here.

If efficiency and speed are the most importance, the electrical inspection of the flash unit 17 may be terminated as soon as the flash unit 17 is disqualified in any of the inspection steps.

According to another embodiment of the invention, the ID unit 72 may be replaced by a classification code indicator 150, as is shown in FIG. 25. The classification code indicator 150 is provided with four strips 150a to 150d. The four strips are movable to change the amount of projection to the outside, so that the flash unit 17 held by a pallet 151 having the classification code indicator 150 may be classified according to the amount of projection of these strips 150a to 150d. The amount of projection of these strips may be detected electrically or optically in the unit discharge sections 58 to 60.

While the above described embodiments relate to the flash unit inspection system for those flash units 17 which are recovered from used film packages, the flash unit inspection system of the present invention is applicable to the inspection of new flash units.

The inspection system of the present invention is not limited to use for inspection of the flash units, but may be applicable to inspecting any kind of assemblies constituted of a plurality of parts, such as the photo-taking units of the film packages.

The subdividing step may be performed manually instead of automatically. Concerning those parts of the assemblies which can be hard to break or damage, it is preferable to sort more than one of those parts into the same group to reduce the number of trays for storing the reparable assemblies by each subdivision for repairs. Also those assemblies which have a plurality of parts to be repaired may be stacked on a tray. In those cases, it is preferable to put a tag or label onto each assembly that has indicia printed thereon for indicating the part or parts to be repaired.

It is also possible to provide the ID unit with a display device such as LED or LCD for visual confirmation of the results of inspection and classification. The repair section may be disposed either inside or outside the inspection line. Some parts may be restored to the normal state by using tools, whereas some parts are changed by new ones in the repair section. The ID units 72 and 81 may be provided with a microwave communication system, a magnetic communication system or another communication system, instead of the above-described optical communication system, depending on the communication distance, cost and other conditions.

Also, it will be apparent to one skilled in the art that various other modifications can be made to the disclosed embodiments without departing from the scope of the invention as defined by the appended claims.

What is claimed is:

1. A method for inspecting an assembly constituted of a plurality of parts, comprising the steps of:

holding said assembly by a pallet in a predetermined state;

circulating a plurality of said pallets around a plurality of inspection stations for sequentially inspecting said assemblies with respect to a plurality of inspection items;

providing each of said pallets with a data management device having a data memory and a data communication system for allowing to read and write said data memory through remote processing;

writing measurement data obtained in each inspection station in said data memory of said data management device;

judging said measurement data with reference to threshold values which are predetermined for each inspection item by calculating group values of said measurement data according to a predetermined grouping formula and comparing said group values with said threshold values of each inspection item;

classifying said assemblies according to said judgment data on all of said inspection items;

writing judgment data and classification data obtained in said judging step and said classification step in said data memory of a corresponding one of said pallets; and discharging said assemblies from said pallets while being stored in a plurality of groups according to said classification data.

2. A method as recited in claim 1, further comprising the steps of:

collecting all data written in said data memory of said data management device of said pallets in a control device; and making a data base from said data in said control device.

3. A method for inspecting an assembly constituted of a plurality of parts, comprising the steps of:

holding said assembly by a pallet in a predetermined state;

circulating a plurality of said pallets around a plurality of inspection stations for sequentially inspecting said assemblies with respect to a plurality of inspection items;

providing each of said pallets with a data management device having a data memory and a data communication system for allowing to read and write said data memory through remote processing;

writing measurement data obtained in each inspection station in said data memory of said data management device;

judging said measurement data with reference to threshold values which are predetermined for each inspection item;

classifying said assemblies according to said judgment data on all of said inspection items;

writing judgment data and classification data obtained in said judging step and said classification step in said data memory of a corresponding one of said pallets; and discharging said assemblies from said pallets while being stored in a plurality of groups according to said classification data, wherein said assemblies are recovered from used articles for recycling, and are classified into reusable, reparable and not-reusable ones.

4. A method as recited in claim 3, further comprising the steps of:

writing career data of said assembly in said data memory of said data management device before transporting said pallet to said inspection stations;

reading said career data from said data memory in each of said inspection stations; and selecting appropriate inspection conditions based on said career data before executing each inspection.

5. A method as recited in claim 4, further comprising the step of sorting those assemblies which are classified reparable, according to which part needs repairs with reference to said judgment data written in said data memory.

6. A system for inspecting an assembly constituted of a plurality of parts, comprising:

pallets each holding said assembly in a predetermined state;

a circulating device for circulating said pallets around a plurality of inspection stations for sequentially inspecting said assembly with respect to a plurality of inspection items;

a data management device which is provided in each pallet and has a data memory which stores measurement data obtained in each of said plurality of inspection stations and a data communication system for allowing to read and write said data memory;

a judging device which makes a judgment on each inspection item by comparing said measurement data with threshold values which are predetermined for each inspection item, and writes judgment data in said data memory of said data management device, wherein said judging device is being disposed in each of said inspection stations, and said judgment data is written in said data memory in each inspection station;

a control device which collects said measurement data and said judgment data, classifies said assembly depending on said judgment data of all said inspection items, and writes classification data in said data memory of said data management device; and a discharging device which reads said classification data from said data memory and discharges said assembly from said pallet into one of a plurality of assembly storage sections which is designated by said classification data written in said data memory.

7. A system as recited in claim 6, wherein said judging device is included in said control device, and said control device reads said measurement data from said data memory and then writes said judgment data in said data memory after said pallet goes through all of said inspection stations.

8. A system for inspecting an assembly constituted of a plurality of parts, comprising:

pallets each holding said assembly in a predetermined state;

a circulating device for circulating said pallets around a plurality of inspection stations for sequentially inspecting said assembly with respect to a plurality of inspection items;

a data management device which is provided in each pallet and has a data memory which stores measurement data obtained in each of said plurality of inspection stations and a data communication system for allowing to read and write said data memory;

a judging device which makes a judgment on each inspection item by comparing said measurement data with threshold values which are predetermined for each inspection item, and writes judgment data in said data memory of said data management device;

a control device which collects said measurement data and said judgment data, classifies said assembly depending on said judgment data of all said inspection items, and writes classification data in said data memory of said data management device; and a discharging device which reads said classification data from said data memory and discharges said assembly from said pallet into one of a plurality of assembly storage sections which is designated by said classification data written in said data memory, wherein said assembly has electric parts, and there are a plurality of electrical inspection stations for simultaneously inspecting a plurality of said assemblies about electrical properties thereof, said plurality of electrical inspection stations being disposed in each of a plurality of parallel branches which diverge from and converge into a circular path of said pallets.

9. An inspection apparatus for inspecting electrical properties of a flash unit which has a charge switch, a main capacitor, power supply terminals, a synchronizing switch and a flash tube, wherein said main capacitor is charged through said power supply terminals while said charge switch is turned on, and said flash tube emits light when said synchronizing switch is turned on to discharge said main capacitor after being fully charged, said inspection apparatus comprising:

a base portion movable between a retracted position retracted from a path of said flash unit conveyed on a pallet conveyer in a predetermined posture, and an operative position near said flash unit fed to and stopped at said inspection apparatus;

proving pins mounted in said movable base portion to be brought into contact with said charge switch, said main capacitor, said synchronizing switch and said power supply terminals when said base portion is in said operative position;

an actuator mounted in the movable base portion, said actuator can actuate said synchronizing switch when said base portion is in said operative position;

a photo-sensor mounted in the movable base portion, said photo-sensor can detect light from said flash tube when said base portion is in said operative position;

a power supply device connectable to the power supply terminals through said proving pins; and a controller which controls charging of the main capacitor through said proving pins while measuring the voltage of said main capacitor, and drives said actuator to turn said synchronizing switch on to measure light amount from said flash tube through said photo-sensor.

10. An inspection apparatus as recited in claim 9, wherein said power supply device includes a high D.C. voltage supply device which charges said main capacitor with a high D.C. voltage less than a withstand voltage of said main capacitor, and terminates charging when the voltage of the main capacitor reaches a given level.

11. An inspection apparatus as recited in claim 9, wherein said power supply device further includes a constant voltage source for supplying a constant voltage that corresponds to a battery voltage designated for said flash unit.

12. An inspection apparatus as recited in claim 11, wherein said controller further measures contact resistance of said synchronizing switch, leak current of said power supply terminals, and charge times at many points according to a predetermined sequence.

13. An inspection apparatus as recited in claim 12, wherein said flash unit further has a neon indicator for indicating that said main capacitor is fully charged, and said inspection apparatus further comprises a neon emission detector for inspecting the operation of said neon indicator.

14. An inspection apparatus as recited in claim 9, further comprising a data communication system for transferring inspection data from said controller to a data memory provided in said pallet and/or a central processing unit.

15. An inspection apparatus as recited in claim 14, wherein said controller performs grouping of measurement data and compares group values with predetermined threshold values, so as to make a judgment on said measurement data.

* * * * *